United States Patent
Shah et al.

(10) Patent No.: US 8,205,162 B2
(45) Date of Patent: *Jun. 19, 2012

(54) EXECUTION CONTEXTS FOR A GRAPHICAL PROGRAM

(75) Inventors: Darshan K. Shah, Austin, TX (US); Aljosa Vrancic, Austin, TX (US)

(73) Assignee: National Instruments Corporation, Austin, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/949,090

(22) Filed: Nov. 18, 2010

(65) Prior Publication Data

US 2011/0061007 A1    Mar. 10, 2011

Related U.S. Application Data

(63) Continuation of application No. 11/760,006, filed on Jun. 8, 2007, now Pat. No. 7,840,904.

(60) Provisional application No. 60/821,512, filed on Aug. 4, 2006.

(51) Int. Cl.
   *G06F 3/00* (2006.01)
   *G06F 9/44* (2006.01)
   *G06F 15/16* (2006.01)

(52) U.S. Cl. ........ 715/763; 715/835; 715/764; 715/967; 717/109

(58) Field of Classification Search ................. 715/763, 715/764, 765, 769, 771, 835, 846, 967; 717/104–109
   See application file for complete search history.

(56) References Cited

U.S. PATENT DOCUMENTS

| | | |
|---|---|---|
| 5,237,691 A | 8/1993 | Robinson et al. |
| 6,173,438 B1 | 1/2001 | Kodosky et al. |
| 6,219,628 B1 | 4/2001 | Kodosky et al. |
| 6,526,566 B1 | 2/2003 | Austin |
| 6,601,233 B1 | 7/2003 | Underwood |
| 6,629,123 B1 | 9/2003 | Hunt |
| 6,876,368 B2 | 4/2005 | Dove et al. |
| 7,028,222 B2 | 4/2006 | Peterson |
| 7,062,718 B2 | 6/2006 | Kodosky et al. |
| 7,185,287 B2 | 2/2007 | Ghercioiu et al. |
| 7,200,817 B2 | 4/2007 | Dove et al. |
| 7,290,244 B2 | 10/2007 | Peck et al. |
| 2005/0235290 A1 | 10/2005 | Jefferson et al. |
| 2005/0257195 A1 | 11/2005 | Morrow et al. |
| 2006/0036799 A1 | 2/2006 | Shah et al. |
| 2006/0041859 A1 | 2/2006 | Vrancic et al. |
| 2007/0088865 A1 | 4/2007 | Breyer |
| 2007/0294663 A1 | 12/2007 | McGuire et al. |
| 2008/0034299 A1 | 2/2008 | Hayles et al. |
| 2008/0034310 A1 | 2/2008 | Kodosky et al. |
| 2008/0104527 A1 | 5/2008 | Jaeger |

*Primary Examiner* — Xiomar L Bautista
(74) *Attorney, Agent, or Firm* — Meyertons Hood Kivlin Kowert & Goetzel, P.C.; Jeffrey C. Hood; Mark S. Williams

(57) ABSTRACT

System and method for creating a graphical program (GP) having portions that execute on different targets. A GP including a plurality of interconnected nodes visually indicating functionality of the program is created in response to user input, including a first graphical code portion with a first execution context specifying execution of the first graphical code portion on a first target. A second execution context indicating a second target for execution of a second graphical code portion of the GP is established in response to user input, e.g., by displaying a context structure indicating the second execution context and associating the second graphical code portion with the context structure in response to user input. During execution of the GP, the first graphical code portion executes on the first target using the first execution context, and the second graphical code portion executes on the second target using the second execution context.

49 Claims, 9 Drawing Sheets

EXECUTION CONTEXTS FOR A GRAPHICAL PROGRAM

PRIORITY DATA

This application is a continuation of U.S. patent application Ser. No. 11/760,006 titled "Execution Target Structure Node For A Graphical Program" and filed on Jun. 8, 2007, now U.S. Pat. No. 7,840,904 who inventors are Darshan K. Shah and Aljosa Vrancic, which claims benefit of priority to U.S. Provisional Application Ser. No. 60/821,512, titled "Execution Target Structure Node For A Graphical Program", filed on Aug. 4, 2006, and whose inventors are Darshan K. Shah and Aljosa Vrancic, and which are all hereby incorporated by reference in their entirety as though fully and completely set forth herein.

FIELD OF THE INVENTION

The present invention relates to the field of graphical programming, and more particularly to a system and method for creating a graphical program having portions that execute on different execution targets.

DESCRIPTION OF THE RELATED ART

Traditionally, high-level text-based programming languages have been used by programmers in writing application programs. Many different high level text-based programming languages exist, including BASIC, C, C++, Java, FORTRAN, Pascal, COBOL, ADA, APL, etc. Programs written in these high level text-based languages are translated to the machine language level by translators known as compilers or interpreters. The high level text-based programming languages in this level, as well as the assembly language level, are referred to herein as text-based programming environments.

Increasingly, computers are required to be used and programmed by those who are not highly trained in computer programming techniques. When traditional text-based programming environments are used, the user's programming skills and ability to interact with the computer system often become a limiting factor in the achievement of optimal utilization of the computer system.

There are numerous subtle complexities which a user must master before he can efficiently program a computer system in a text-based environment. The task of programming a computer system to model or implement a process often is further complicated by the fact that a sequence of mathematical formulas, steps or other procedures customarily used to conceptually model a process often does not closely correspond to the traditional text-based programming techniques used to program a computer system to model such a process. In other words, the requirement that a user program in a text-based programming environment places a level of abstraction between the user's conceptualization of the solution and the implementation of a method that accomplishes this solution in a computer program. Thus, a user often must substantially master different skills in order to both conceptualize a problem or process and then to program a computer to implement a solution to the problem or process. Since a user often is not fully proficient in techniques for programming a computer system in a text-based environment to implement his solution, the efficiency with which the computer system can be utilized often is reduced.

To overcome the above shortcomings, various graphical programming environments now exist which allow a user to construct a graphical program or graphical diagram, also referred to as a block diagram. U.S. Pat. Nos. 4,901,221; 4,914,568; 5,291,587; 5,301,301; and 5,301,336; among others, to Kodosky et al disclose a graphical programming environment which enables a user to easily and intuitively create a graphical program. Graphical programming environments such as that disclosed in Kodosky et al can be considered a higher and more intuitive way in which to interact with a computer. A graphically based programming environment can be represented at a level above text-based high level programming languages such as C, Basic, Java, etc.

A user may assemble a graphical program by selecting various icons or nodes which represent desired functionality, and then connecting the nodes together to create the program. The nodes or icons may be connected by lines representing data flow between the nodes, control flow, or execution flow. Thus the block diagram may include a plurality of interconnected icons such that the diagram created graphically displays a procedure or method for accomplishing a certain result, such as manipulating one or more input variables and/or producing one or more output variables. In other words, the graphical program or block diagram includes a plurality of interconnected nodes that visually or graphically represents the functionality of the program.

In response to the user constructing a diagram or graphical program using the block diagram editor, data structures and/or program instructions may be automatically constructed which characterize an execution procedure that corresponds to the displayed procedure. The graphical program may be compiled or interpreted by a computer.

A graphical program may have a graphical user interface. For example, in creating a graphical program, a user may create a front panel or user interface panel. The front panel may include various graphical user interface elements or front panel objects, such as user interface controls and/or indicators, that represent or display the respective input and output that will be used by the graphical program, and may include other icons which represent devices being controlled.

Thus, graphical programming has become a powerful tool available to programmers. Graphical programming environments such as the National Instruments LabVIEW product have become very popular. Tools such as LabVIEW have greatly increased the productivity of programmers, and increasing numbers of programmers are using graphical programming environments to develop their software applications. In particular, graphical programming tools are being used for test and measurement, data acquisition, process control, man machine interface (MMI), supervisory control and data acquisition (SCADA) applications, modeling, simulation, image processing/machine vision applications, and motion control, among others.

In parallel with the development of the graphical programming model, distributed execution of programs has become increasingly used, where, for example, various portions of a program are distributed for execution on different platforms. For example, in a typical text-based application, e.g., in a C/C++, etc. application, one can target particular thread to a particular CPU if the operating system (OS) allows it. On some OS's, one can also target processes. However, currently there are no simple ways to selectively target a specific part of a graphical program diagram to a particular execution target or CPU. Currently, such distribution of graphical programs has generally been performed manually, and with a great deal of difficulty. For example, designing a distributed application with optimum load balancing among execution targets, with the least communication bandwidth requirement between nodes, and with loose binding between the distributed portions of the program is non-trivial even for small applications, and becomes substantially more difficult as the size and complexity of the graphical program increase. For example, as the application size and complexity change in scale (e.g., increase), the load balancing and bandwidth requirements or specification may also change, i.e., distributed component boundaries may require reconsideration. Typically, even for experts, an experimental trial and error approach is used in an iterative manner to properly distribute the application in a substantially optimal manner. In many cases, a small experimental change may force the user to modify many "broken" components to get the application running properly again. This may be made more difficult if the overall structure of the application is not apparent, due to experimental componentizations (partitioning graphical code portions for distribution) made in earlier iterations of the distribution specification process, e.g., retracting later changes may require starting the process over from the beginning Thus, improved systems and methods are desired for distributing graphical programs across multiple execution targets.

SUMMARY OF THE INVENTION

Various embodiments of a system and method for creating a graphical program having portions that execute on different execution targets are described.

First, a graphical program may be created on a computer system, e.g., in response to user input, or programmatically. The graphical program preferably is a graphical data flow program, although in other embodiments, the graphical program may be another type of flow diagram, such as a control flow, or execution flow diagram. The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons that visually indicates the functionality of the program. The graphical program preferably includes a first graphical code portion with a first execution context specifying execution of the first graphical code portion on a first target. The graphical program may be developed under a project (which itself may operate under a development environment), where the project is considered to reside and execute on a host system. The first execution context may specify the host system as the execution target (i.e., the first target) for the first graphical code portion, or may specify a different target for execution of that code.

As used herein the term "execution context" refers to a data structure (or a plurality of data structures) used to run an execution system. For example, there may be an execution context for each execution thread in which a graphical program or graphical program portion or section is executed. Each thread may call an Exec( ) function (or equivalent) with a pointer to an execution context for that thread.

In one embodiment, graphical code may be compiled into code sections each of which includes no parallelism, although it should be noted that multiple code sections may be executed in parallel, e.g., via threads running in parallel. An execution context preferably includes (among other items), a designation or specification of a target, i.e., an execution target for executing graphical code associated with the execution context. For example, the specification may include a network address of a remote execution platform, or a CPU (central processing unit) number, e.g., in a multi-processor system, among others. In one embodiment, an execution context may also include a run queue of queue elements (e.g., a pointer to a run queue), each of which represents a respective code section, as well as a pointer to (or other designation of) the currently executing queue element representing the currently executing code section.

Note that while there is generally an execution context per thread, different execution contexts may share run queues. Thus, a run queue may include a plurality of executable code sections from which one or more execution contexts can pull code sections for execution by respective threads. Note that, depending on the number of processors in the system, the threads may execute their respective code sections in parallel. For example, each queue element may include a pointer into the code section (i.e., a code pointer or program counter), comprising an address for the next instruction to execute, as well as a pointer to (or other indication of) a data space associated with code. To execute the code section, a register may be loaded with the data space pointer, and the compiled code may reference the data via the data space pointer. Note that a code section may return from execution before the entire code section is executed, where the current code address (code pointer or program counter) points to the next instruction to be executed. The queue element may be placed back into the run queue, and subsequently pulled by an execution context for continued execution by a thread, where the code section resumes execution at the address indicated by the code pointer or program counter. Note that in some embodiments, each section of graphical code may be targeted to an arbitrary subset of targets, e.g., CPUs, and the program schedulers (execution scheduling processes) may use any scheduling algorithms as desired to assign a thread to a particular CPU.

It should be noted that any type of execution target or platform may be designated for use by the execution context, i.e., any computing elements capable of executing code may be targeted as desired. Exemplary execution targets may include, for example, CPU-based systems, field programmable gate arrays (FPGAs), digital signal processors (DSPs), micro-controllers, etc., as well as any combinations of the above, among others. For example, a target may include one or more FPGAs and one or more DSPs that may operate in conjunction.

A second execution context for a second graphical code portion of the graphical program may be established in response to user input, where the second execution context specifies or indicates the second target for execution of the second graphical code portion of the graphical program. In one embodiment, establishing the second execution context may include displaying a context structure on the display in response to user input, where the context structure specifies or indicates the second execution context for graphical program code associated with the context structure. In various embodiments, the context structure may be any of various types of structure. For example, the context structure may be a timed structure, such as a timed loop structure or a timed sequence structure. In one embodiment, the context structure may be a node structure that only or primarily specifies and manages execution of associated graphical code in an execution context, i.e., on a designated execution target. The context structure may include one or more configurable terminals for communication between graphical code inside the context structure and graphical code (or external elements or systems, including the user) outside the context structure.

The second graphical code portion may be associated with the context structure in response to user input. This association may be made via any of a number of ways. For example, in one embodiment, the user may drag and drop the second graphical code portion into the context structure using a pointing device, such as a mouse. In another exemplary embodiments, the user may draw the context structure around the second graphical code portion. For example, the user may invoke a special mode, e.g., a drawing mode or equivalent, and simply draw a boundary, e.g., a polygon, circle, or freehand border, around the second graphical code portion. In one embodiment, the user may "drag" a (rectangular) bounding box (or circle or ellipse) around the code portion. Of course, any other means for associating the code portion with the context structure may be used as desired. For example, in one embodiment, the user may invoke a menu on the code portion and/or the context structure, and may specify the association via menu selection. In another embodiment, the user may invoke an association wizard, where the wizard leads the user through the association process via a number of dialogs, whereby the user provides input specifying the association.

In one embodiment, establishing the second execution context may include configuring the context structure. Of course, any of various means may be used to configure the context structure. For example, the user may interact with a dialog box, property page, menu(s), or wizard to statically configure the context structure, e.g., the user may invoke a configuration dialog by invoking a "Configure" option (or its equivalent) on a context menu for the context structure or a configuration node, or by double-clicking on the border of the structure or the configuration node, among other techniques. The user may then interact with the configuration dialog to specify information such as the execution target. In one embodiment the user may utilize the configuration dialog to specify other properties of the context structure as well, such as a structure name, and/or other information that may be useful for managing the context structure.

In some embodiments, the execution context may be configured through the project in which the graphical program is developed. For example, the type and/or definition of the target may be defined in the project under which the graphical program with the context structure is specified. Since this configuration may occur at the project level, edit-time functionality regarding the graphical code associated with the execution context, e.g., included in the context structure, may be contingent upon the specified target. In other words, the editing environment and/or graphical program code, e.g., nodes, may adapt to the target specification in the project. For example, editing behavior within the context structure may be based on the type and configuration information of the specified target, i.e., the editing environment behavior may be automatically customized based on the target definition of the context structure (the target of the execution context). The environment or editor may provide help information, hints, and feedback to the user while the user is building/writing the code within the execution structure node. In one embodiment, the editor may prevent users from designing and building applications that cannot run on the specified target. For example, in one embodiment, the editor may flag errors when the user attempts to add or use nodes (functions) within the context structure that are not supported by, appropriate for, or relevant to, the specified target. In other words, the editor may enforce target specific syntax and semantic checking within the context structure.

As another example, in some embodiments, palettes from which the user may select (e.g., drag and drop) nodes for inclusion in the context structure may automatically present or display only those nodes or functions that are supported by or appropriate for the target. Alternatively, or additionally, the palettes may display all nodes available, but only allow supported or appropriate nodes to be included in the graphical code section in the context structure.

In some embodiments, compilation and code generation with respect to the graphical program may be specific to the specified target. In other words, the graphical code associated with the context structure may be compiled in a manner that is specific to the target. Similarly, any code, e.g., C/C++ code, generated from the graphical code in the context structure may be specific or directed to the specified target. Moreover, in one embodiment, the environment and/or context structure may automatically manage elements external to the graphical program that portions of the graphical code within the context structure may be dependent on. In other words, in some embodiments, the graphical code within the context structure node may refer to external elements, e.g., to dynamic link libraries (DLLs), configuration files or variables (that are defined externally), hardware configurations, and/or other external entities, i.e., the graphical code section within the context structure may not be completely self contained, but rather may include references to entities or elements that are defined outside the graphical code section, or even the entire graphical program. These external elements or entities may be referred to as "dependencies", and may be required to be present in correct form at the target for the target to be able to execute the code. Thus, in some embodiments, the context structure and/or the environment may find such dependencies and compile and deploy the external dependencies accordingly.

In some embodiments, the context structure may be configured dynamically, i.e., at or during runtime. For example, in one embodiment, the at least one graphical program element may include a front panel communicatively coupled to the context structure. The front panel may dynamically receive user input specifying the configuration information for the context structure, and may provide the configuration information to the context structure to configure the context structure.

In some embodiments, establishing the second execution context may include connecting at least one graphical program element to the context structure, and the at least one graphical program element providing configuration information to the context structure, thereby configuring the context structure, where the configuration information includes a specification or designation of the second target for execution of the second graphical code portion of the graphical program. For example, in some embodiments, configuring the context structure may include connecting one or more wires to one or more terminals associated with the context structure in response to user input, where the one or more wires specify the configuration information.

In some embodiments, the at least one graphical program element may include a node coupled to the context structure, where providing configuration information to the context structure may include the node providing the configuration information to the context structure to configure the context structure in accordance with attributes of the node.

In one embodiment the user may have the option to set properties of the context structure both statically, e.g., by using a configuration dialog, menu, property page, etc., and dynamically by connecting wires to terminals on the block diagram of the graphical program. In a further embodiment, the context structure may be configured via a call from a calling or parent program, which is another example of dynamic configuration.

Thus, the method may include configuring the context structure statically, i.e., at compile or edit time of the graphical program, and/or may include re-configuring the context structure dynamically at or during runtime of the graphical program.

Thus, configuration of the execution context may be performed via various means. More specifically, as described above, target definition or specification may be provided at several levels, such as by the project, by the context structure, dynamically by connecting wires to the context structure, and/or by a function call (i.e., a subVI call).

In some embodiments, the context structure may also determine or manage how graphical code within the context structure (either in compiled form or in source form) is deployed to the target, along with its dependencies (i.e., dependent external elements or entities). In the simplest case, deployment may simply mean copying the code to the target. However, depending on the target, deployment may be more complex. For example, while for some targets, the code may need to be copied to a hard drive of the target, while for other, e.g., embedded controllers, the code may need to be burned in to flash memory (non volatile RAM). Moreover, if the target is remote, it may be required to send the code to the target over the bus to which the target is coupled, e.g., the target may be connected to the host via a serial, Ethernet, PCI, or PCI express, bus, among others, and the context structure may automatically deploy the code appropriately, depending on the particular target for the code. In other words, the context structure may deploy the graphical code (or code derived from the graphical code) to the target in an appropriate manner, depending on the nature of the target.

In one embodiment, the context structure may also be operable to manage communications with respect to the graphical code inside the context structure, e.g., between the graphical code inside the structure and elements outside the structure.

In some embodiments, configuring the context structure may include specifying, and possibly restricting, resources to be used when running the code under or on the target. For example, the context structure may allow specification of the number of CPUs to utilize on the target, or the particular CPU(s) to use, e.g., to use only one CPU on the target. As another example, the context structure may allow specification of how much bandwidth of a processor or CPU to use in executing on the target. As yet another example, the user may be able to specify (via the context structure configuration) how much RAM (random access memory) to use on the target. Of course, in other embodiments, any other type of resource use specification or management for the specified target may be configured as desired. Thus, target resource allocation and use may be configured and managed or implemented via the context structure.

In one embodiment, the first execution context mentioned above may include a default execution context for the graphical program. In other words, in contrast with the second execution context, whose configuration is described above according to various approaches, the first execution context may have a default configuration, and thus, may not need to be configured by the user. Of course, in other embodiments, the first execution context may be configured using any of the approaches described above, among others.

Finally, the graphical program may be executed, where during execution of the graphical program, the first graphical code portion executes on the first target using the first execution context, and the second graphical code portion executes on the second target using the second execution context. Thus, the context structure may be operable to invoke execution of the second graphical code portion on the specified second target, thereby causing the second graphical code portion to run on the second target, while the first graphical code portion executes on the first target (in accordance with the first execution context).

The context structure may also facilitate debugging of the code contained in the context structure, i.e., the second graphical code portion.

Thus, various embodiments of the present invention may facilitate distributed execution of portions of a graphical program on respective targets.

BRIEF DESCRIPTION OF THE DRAWINGS

A better understanding of the present invention can be obtained when the following detailed description of the preferred embodiment is considered in conjunction with the following drawings, in which.

Figure 1:
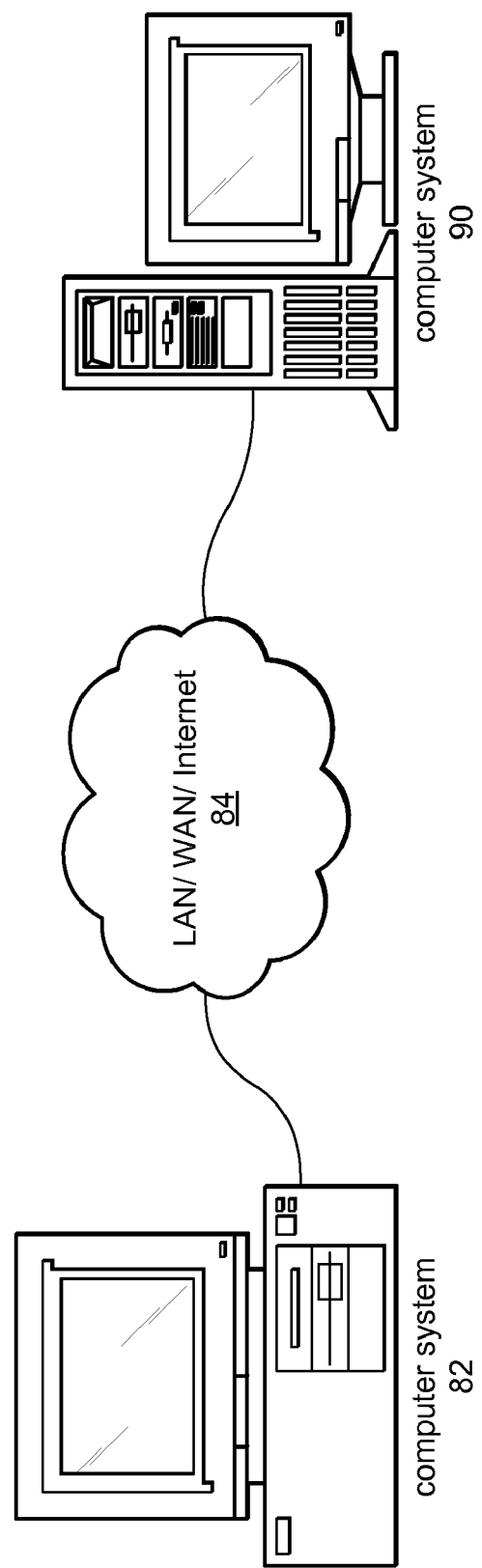
FIG. 1 illustrates a network system comprising two or more computer systems configured to implement embodiments of the present invention.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Incorporation by Reference:

The following references are hereby incorporated by reference in their entirety as though fully and completely set forth herein:

U.S. Provisional Application Ser. No. 60/821,512, titled "Execution Target Structure Node For A Graphical Program", filed on Aug. 4, 2006.

U.S. Pat. No. 4,914,568 titled "Graphical System for Modeling a Process and Associated Method," issued on Apr. 3, 1990.

U.S. Pat. No. 5,481,741 titled "Method and Apparatus for Providing Attribute Nodes in a Graphical Data Flow Environment".

U.S. Pat. No. 6,173,438 titled "Embedded Graphical Programming System" filed Aug. 18, 1997.

U.S. Pat. No. 6,219,628 titled "System and Method for Configuring an Instrument to Perform Measurement Functions Utilizing Conversion of Graphical Programs into Hardware Implementations," filed Aug. 18, 1997.

U.S. Pat. No. 7,210,117, published as Publication No. 20010020291 (Ser. No. 09/745,023) titled "System and Method for Programmatically Generating a Graphical Program in Response to Program Information," filed Dec. 20, 2000.

U.S. Pat. No. 7,574,690, published as Publication No. 20050050515 (Ser. No. 10/892,829) titled "A Graphical Program Which Executes a Timed Loop", filed Jul. 16, 2004.

U.S. patent application Ser. No. 11/462,393 titled "Asynchronous Wires in a Graphical Programming System," filed Aug. 4, 2006.

Terms

The following is a glossary of terms used in the present application:

Memory Medium—Any of various types of memory devices or storage devices. The term "memory medium" is intended to include an installation medium, e.g., a CD-ROM, floppy disks 104, or tape device; a computer system memory or random access memory such as DRAM, DDR RAM, SRAM, EDO RAM, Rambus RAM, etc.; or a non-volatile memory such as a magnetic media, e.g., a hard drive, or optical storage. The memory medium may comprise other types of memory as well, or combinations thereof. In addition, the memory medium may be located in a first computer in which the programs are executed, or may be located in a second different computer which connects to the first computer over a network, such as the Internet. In the latter instance, the second computer may provide program instructions to the first computer for execution. The term "memory medium" may include two or more memory mediums which may reside in different locations, e.g., in different computers that are connected over a network.

Carrier Medium—a memory medium as described above, as well as a physical transmission medium, such as a bus, network, and/or other physical transmission medium that conveys signals such as electrical, electromagnetic, or digital signals.

Programmable Hardware Element—includes various hardware devices comprising multiple programmable function blocks connected via a programmable interconnect. Examples include FPGAs (Field Programmable Gate Arrays), PLDs (Programmable Logic Devices), FPOAs (Field Programmable Object Arrays), and CPLDs (Complex PLDs). The programmable function blocks may range from fine grained (combinatorial logic or look up tables) to coarse grained (arithmetic logic units or processor cores). A programmable hardware element may also be referred to as "reconfigurable logic".

Program—the term "program" is intended to have the full breadth of its ordinary meaning. The term "program" includes 1) a software program which may be stored in a memory and is executable by a processor or 2) a hardware configuration program useable for configuring a programmable hardware element.

Software Program—the term "software program" is intended to have the full breadth of its ordinary meaning, and includes any type of program instructions, code, script and/or data, or combinations thereof, that may be stored in a memory medium and executed by a processor. Exemplary software programs include programs written in text-based programming languages, such as C, C++, Pascal, Fortran, Cobol, Java, assembly language, etc.; graphical programs (programs written in graphical programming languages); assembly language programs; programs that have been compiled to machine language; scripts; and other types of executable software. A software program may comprise two or more software programs that interoperate in some manner.

Hardware Configuration Program—a program, e.g., a netlist or bit file, that can be used to program or configure a programmable hardware element.

Diagram—A graphical image displayed on a computer display which visually indicates relationships between graphical elements in the diagram. Diagrams may include configuration diagrams, system diagrams, physical diagrams, and/or graphical programs (among others). In some embodiments, diagrams may be executable to perform specified functionality, e.g., measurement or industrial operations, which is represented by the diagram. Executable diagrams may include graphical programs (described below) where icons connected by wires illustrate functionality of the graphical program. Alternatively, or additionally, the diagram may comprise a system diagram which may indicate functionality and/or connectivity implemented by one or more devices. Various graphical user interfaces (GUIs), e.g., front panels, may be associated with the diagram.

Graphical Program—A program comprising a plurality of interconnected nodes or icons, wherein the plurality of interconnected nodes or icons visually indicate functionality of the program. A graphical program is a type of diagram.

The following provides examples of various aspects of graphical programs. The following examples and discussion are not intended to limit the above definition of graphical program, but rather provide examples of what the term "graphical program" encompasses:

The nodes in a graphical program may be connected in one or more of a data flow, control flow, and/or execution flow format. The nodes may also be connected in a "signal flow" format, which is a subset of data flow.

Exemplary graphical program development environments which may be used to create graphical programs include LabVIEW, DasyLab, DiaDem and Matrixx/SystemBuild from National Instruments, Simulink from the MathWorks, VEE from Agilent, WiT from Coreco, Vision Program Manager from PPT Vision, SoftWIRE from Measurement Computing, Sanscript from Northwoods Software, Khoros from Khoral Research, SnapMaster from HEM Data, VisSim from Visual Solutions, ObjectBench by SES (Scientific and Engineering Software), and VisiDAQ from Advantech, among others.

The term "graphical program" includes models or block diagrams created in graphical modeling environments, wherein the model or block diagram comprises interconnected nodes or icons that visually indicate operation of the model or block diagram; exemplary graphical modeling environments include Simulink, SystemBuild, VisSim, Hypersignal Block Diagram, etc.

A graphical program may be represented in the memory of the computer system as data structures and/or program instructions. The graphical program, e.g., these data structures and/or program instructions, may be compiled or interpreted to produce machine language that accomplishes the desired method or process as shown in the graphical program.

Input data to a graphical program may be received from any of various sources, such as from a device, unit under test, a process being measured or controlled, another computer program, a database, or from a file. Also, a user may input data to a graphical program or virtual instrument using a graphical user interface, e.g., a front panel.

A graphical program may optionally have a GUI associated with the graphical program. In this case, the plurality of interconnected nodes are often referred to as the block diagram portion of the graphical program.

Data Flow Graphical Program (or Data Flow Diagram)—A graphical program or diagram comprising a plurality of interconnected nodes, wherein the connections between the nodes indicate that data produced by one node is used by another node.

Physical Diagram—A diagram which visually indicates physical connectivity between physical devices. For example, a physical diagram may visually indicate the connectivity of various physical components in a measurement system, e.g., a computer connected to a measurement device via an Ethernet network. Thus the wires in a physical diagram represent physical connectivity between devices. A physical diagram may show the corresponding "real world" physical system/devices.

Configuration Diagram—A diagram which indicates connectivity between real and/or virtual devices. A configuration diagram may visually indicate physical connectivity between physical devices as shown in a physical diagram. However, in some embodiments, one or more of the devices (or all of the devices) in the configuration diagram may be virtual or simulated devices. Thus, some or all of the devices in the configuration diagram may not be physically present in the system represented by the configuration diagram.

System Diagram—A diagram with one or more device icons and graphical program code, wherein the device icons are use to specify and/or visually indicate where different portions of graphical program code are deployed/executed. A system diagram may indicate where (i.e., on which system/device) programs or code may be executed. For example, the system diagram may include graphical indications showing where portions of the displayed graphical program code are executed. In some embodiments, various ones of the icons may represent processing elements which have associated programs for execution. At least one of the icons may represent logical elements (e.g., executable software functions or graphical program code). One or more of the device icons may represent configurable elements. Thus, the system diagram may provide a system view which allows a user to easily understand where graphical program code is deployed among the various devices in the system.

Node—In the context of a graphical program, an element that may be included in a graphical program. The graphical program nodes (or simply nodes) in a graphical program may also be referred to as blocks. A node may have an associated icon that represents the node in the graphical program, as well as underlying code and/or data that implements functionality of the node. Exemplary nodes (or blocks) include function nodes, sub-program nodes (sub-VIs), terminal nodes, structure nodes, etc. Nodes may be connected together in a graphical program by connection icons or wires. The term "logical element" is used herein to refer to a "node". For example, the term "logical element: may refer to a software program portion or code that is executable by (or implementable on) a processing element, and which is represented iconically on a display. Logical elements include virtual instruments (VIs), primitives, etc. Logical elements may be displayed in various ones of the diagrams described herein, e.g., in graphical programs, system diagrams, etc.

Wire—a graphical element displayed in a diagram on a display that connects icons or nodes in the diagram. The diagram may be a graphical program (where the icons correspond to software functions), a system diagram (where the icons may correspond to hardware devices or software functions), etc. The wire is generally used to indicate, specify, or implement communication between the icons. Wires may represent logical data transfer between icons, or may represent a physical communication medium, such as Ethernet, USB, etc. Wires may implement and operate under various protocols, including data flow semantics, non-data flow semantics, etc. Some wires, e.g., buffered data transfer wires, may be configurable to implement or follow specified protocols or semantics. Wires may indicate communication of data, timing information, status information, control information, and/or other information between icons. In some embodiments, wires may have different visual appearances which may indicate different characteristics of the wire (e.g., type of data exchange semantics, data transport protocols, data transport mediums, and/or type of information passed between the icons, among others).

Graphical User Interface—this term is intended to have the full breadth of its ordinary meaning. The term "Graphical User Interface" is often abbreviated to "GUI". A GUI may comprise only one or more input GUI elements, only one or more output GUI elements, or both input and output GUI elements.

The following provides examples of various aspects of GUIs. The following examples and discussion are not intended to limit the ordinary meaning of GUI, but rather provide examples of what the term "graphical user interface" encompasses:

A GUI may comprise a single window having one or more GUI Elements, or may comprise a plurality of individual GUI Elements (or individual windows each having one or more GUI Elements), wherein the individual GUI Elements or windows may optionally be tiled together.

A GUI may be associated with a diagram, e.g., a graphical program. In this instance, various mechanisms may be used to connect GUI Elements in the GUI with nodes or icons in the diagram/graphical program. For example, when Input Controls and Output Indicators are created in the GUI, corresponding nodes (e.g., terminals) may be automatically created in the diagram or graphical program. Alternatively, the user can place terminal nodes in the diagram which may cause the display of corresponding GUI Elements front panel objects in the GUI, either at edit time or later at run time. As another example, the GUI may comprise GUI Elements embedded in the block diagram portion of the graphical program.

Front Panel—A Graphical User Interface that includes input controls and output indicators, and which enables a user to interactively control or manipulate the input being provided to a program or diagram, and view output of the program or diagram, during execution.

A front panel is a type of GUI. A front panel may be associated with a diagram or graphical program as described above.

In an instrumentation application, the front panel can be analogized to the front panel of an instrument. In an industrial automation application the front panel can be analogized to the MMI (Man Machine Interface) of a device. The user may adjust the controls on the front panel to affect the input and view the output on the respective indicators.

Graphical User Interface Element—an element of a graphical user interface, such as for providing input or displaying output. Exemplary graphical user interface elements comprise input controls and output indicators Input Control—a graphical user interface element for providing user input to a program. Exemplary input controls comprise dials, knobs, sliders, input text boxes, etc.

Output Indicator—a graphical user interface element for displaying output from a program. Exemplary output indicators include charts, graphs, gauges, output text boxes, numeric displays, etc. An output indicator is sometimes referred to as an "output control".

Computer System—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" can be broadly defined to encompass any device (or combination of devices) having at least one processor that executes instructions from a memory medium.

Measurement Device—includes instruments, data acquisition devices, smart sensors, and any of various types of devices that are operable to acquire and/or store data. A measurement device may also optionally be further operable to analyze or process the acquired or stored data. Examples of a measurement device include an instrument, such as a traditional stand-alone "box" instrument, a computer-based instrument (instrument on a card) or external instrument, a data acquisition card, a device external to a computer that operates similarly to a data acquisition card, a smart sensor, one or more DAQ or measurement cards or modules in a chassis, an image acquisition device, such as an image acquisition (or machine vision) card (also called a video capture board) or smart camera, a motion control device, a robot having machine vision, and other similar types of devices. Exemplary "stand-alone" instruments include oscilloscopes, multimeters, signal analyzers, arbitrary waveform generators, spectroscopes, and similar measurement, test, or automation instruments.

A measurement device may be further operable to perform control functions, e.g., in response to analysis of the acquired or stored data. For example, the measurement device may send a control signal to an external system, such as a motion control system or to a sensor, in response to particular data. A measurement device may also be operable to perform automation functions, i.e., may receive and analyze data, and issue automation control signals in response.

Processing Element—A hardware component or device which is operable to execute software, implement code (e.g., program code), be configured according to a hardware description, etc. Processing elements include various processors and/or programmable hardware elements (e.g., field programmable gate arrays (FPGAs)), or systems that contain processors or programmable hardware elements, among others. For example, a processing element may refer to an individual processor in a computer system or the computer system itself.

Configurable Elements—Systems or devices that provide configurable functionality but do not themselves includes processors that process data. Configurable elements may produce and/or consume data that may be provided to or received from various processing elements. A configurable element may have or receive configuration data that specifies functionality of the configurable element. Configurable elements comprise data acquisition (DAQ) devices and/or other sensors/devices.

FIG. 1—Networked Computer System

FIG. 1 illustrates a system including a first computer system 82 that is coupled to a second computer system 90, where one or both of the computers are operable to execute a graphical program according to embodiments of the present invention. The computer system 82 may be coupled via a network 84 (or a computer bus) to the second computer system 90. The computer systems 82 and 90 may each be any of various types, as desired, the particular types shown in FIG. 1 being exemplary only. For example, in some embodiments, the second computer 90 may be a "computer on a card" in a chassis or even installed in the first computer 82. In another embodiment, the second computer may be a programmable hardware element, such as a field programmable gate array (FPGA), or other programmable logic.

As shown in FIG. 1, the computer system 82 (and/or 90) may include a display device operable to display the graphical program as the graphical program is created and/or executed. The display device may also be operable to display a graphical user interface or front panel of the graphical program during execution of the graphical program. The graphical user interface may comprise any type of graphical user interface, e.g., depending on the computing platform.

The computer system 82 may include at least one memory medium on which one or more computer programs or software components according to one embodiment of the present invention may be stored. For example, the memory medium may store one or more graphical programs which are executable to perform the methods described herein. Additionally, the memory medium may store a graphical programming development environment application used to create and/or execute such graphical programs. The memory medium may also store operating system software, as well as other software for operation of the computer system. Various embodiments further include receiving or storing instructions and/or data implemented in accordance with the foregoing description upon a carrier medium.

The network 84 can also be any of various types, including a LAN (local area network), WAN (wide area network), the Internet, or an Intranet, among others. The computer systems 82 and 90 may execute a graphical program in a distributed fashion. For example, computer 82 may execute a first portion of the block diagram of a graphical program and computer system 90 may execute a second portion of the block diagram of the graphical program, as will be described in more detail below. As another example, computer 82 may display the graphical user interface of a graphical program and computer system 90 may execute the block diagram of the graphical program.

In one embodiment, the graphical user interface of the graphical program may be displayed on a display device of the computer system 82, and the block diagram may execute on a device coupled to the computer system 82. The device may include a programmable hardware element and/or may include a processor and memory medium which may execute a real time operating system. In one embodiment, the graphical program may be downloaded and executed on the device. For example, an application development environment with which the graphical program is associated may provide support for downloading a graphical program for execution on the device in a real time system. Of course, the graphical program may be distributed in other ways as desired. For example, various portions of the block diagram of the graphical program may be targeted for execution across multiple targets or platforms.

Exemplary Systems

Embodiments of the present invention may be involved with performing test and/or measurement functions; controlling and/or modeling instrumentation or industrial automation hardware; modeling and simulation functions, e.g., modeling or simulating a device or product being developed or tested, etc. Exemplary test applications where the graphical program may be used include hardware-in-the-loop testing and rapid control prototyping, among others.

However, it is noted that the present invention can be used for a plethora of applications and is not limited to the above applications. In other words, applications discussed in the present description are exemplary only, and the present invention may be used in any of various types of systems. Thus, the system and method of the present invention is operable to be used in any of various types of applications, including the control of other types of devices such as multimedia devices, video devices, audio devices, telephony devices, Internet devices, etc., as well as general purpose software applications such as word processing, spreadsheets, network control, network monitoring, financial applications, games, etc.

Figure 2A:
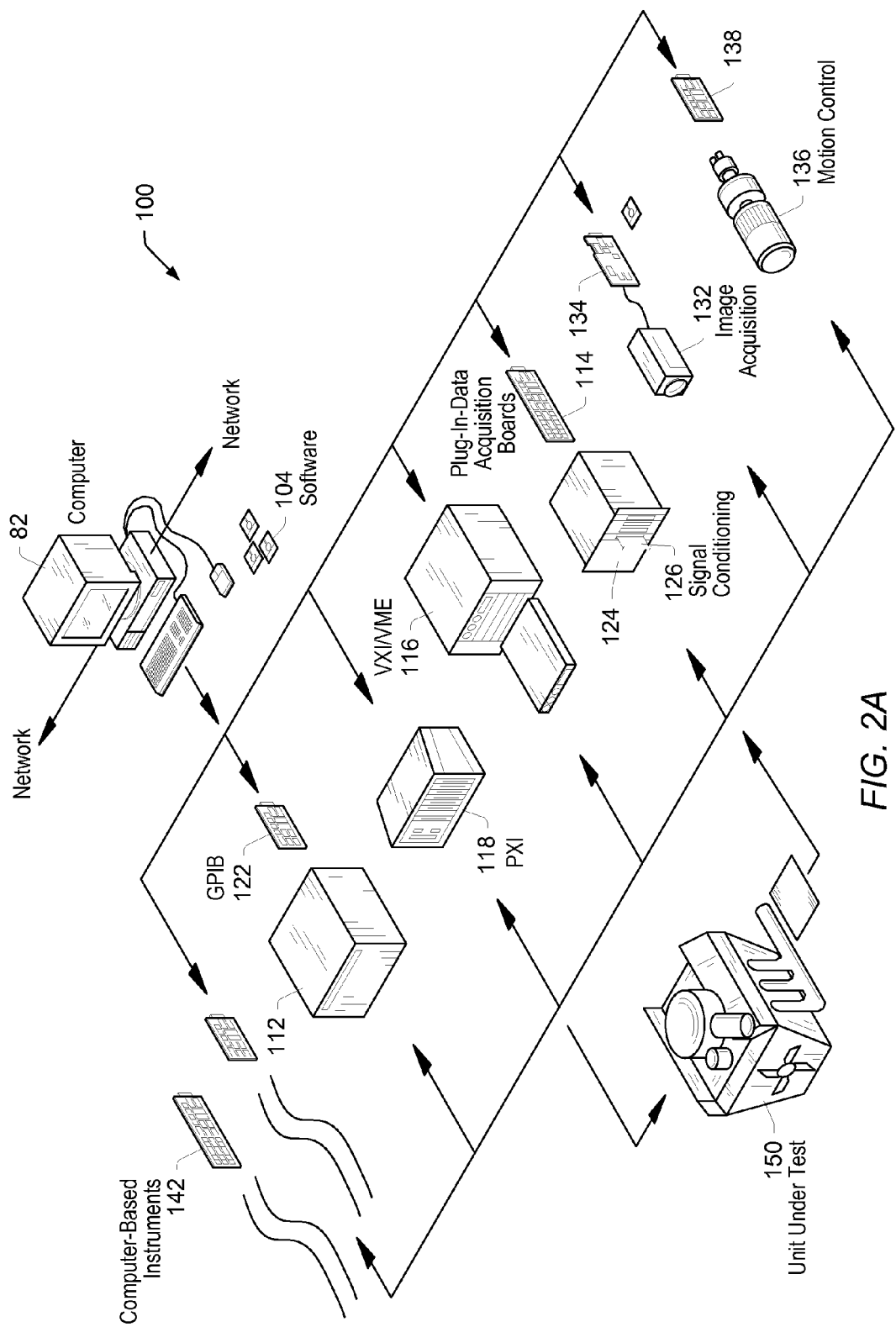
FIG. 2A illustrates an instrumentation control system according to one embodiment of the invention.

FIG. 2A illustrates an exemplary instrumentation control system 100 which may implement embodiments of the invention. The system 100 comprises a host computer 82 which couples to one or more instruments. The host computer 82 may comprise a CPU, a display screen, memory, and one or more input devices such as a mouse or keyboard as shown. The computer 82 may operate with the one or more instruments to analyze, measure or control a unit under test (UUT) or process 150.

The one or more instruments may include a GPIB instrument 112 and associated GPIB interface card 122, a data acquisition board 114 inserted into or otherwise coupled with chassis 124 with associated signal conditioning circuitry 126, a VXI instrument 116, a PXI instrument 118, a video device or camera 132 and associated image acquisition (or machine vision) card 134, a motion control device 136 and associated motion control interface card 138, and/or one or more computer based instrument cards 142, among other types of devices. The computer system may couple to and operate with one or more of these instruments. The instruments may be coupled to the unit under test (UUT) or process 150, or may be coupled to receive field signals, typically generated by transducers. The system 100 may be used in a data acquisition and control application, in a test and measurement application, an image processing or machine vision application, a process control application, a man-machine interface application, a simulation application, or a hardware-in-the-loop validation application, among others.

Figure 2B:
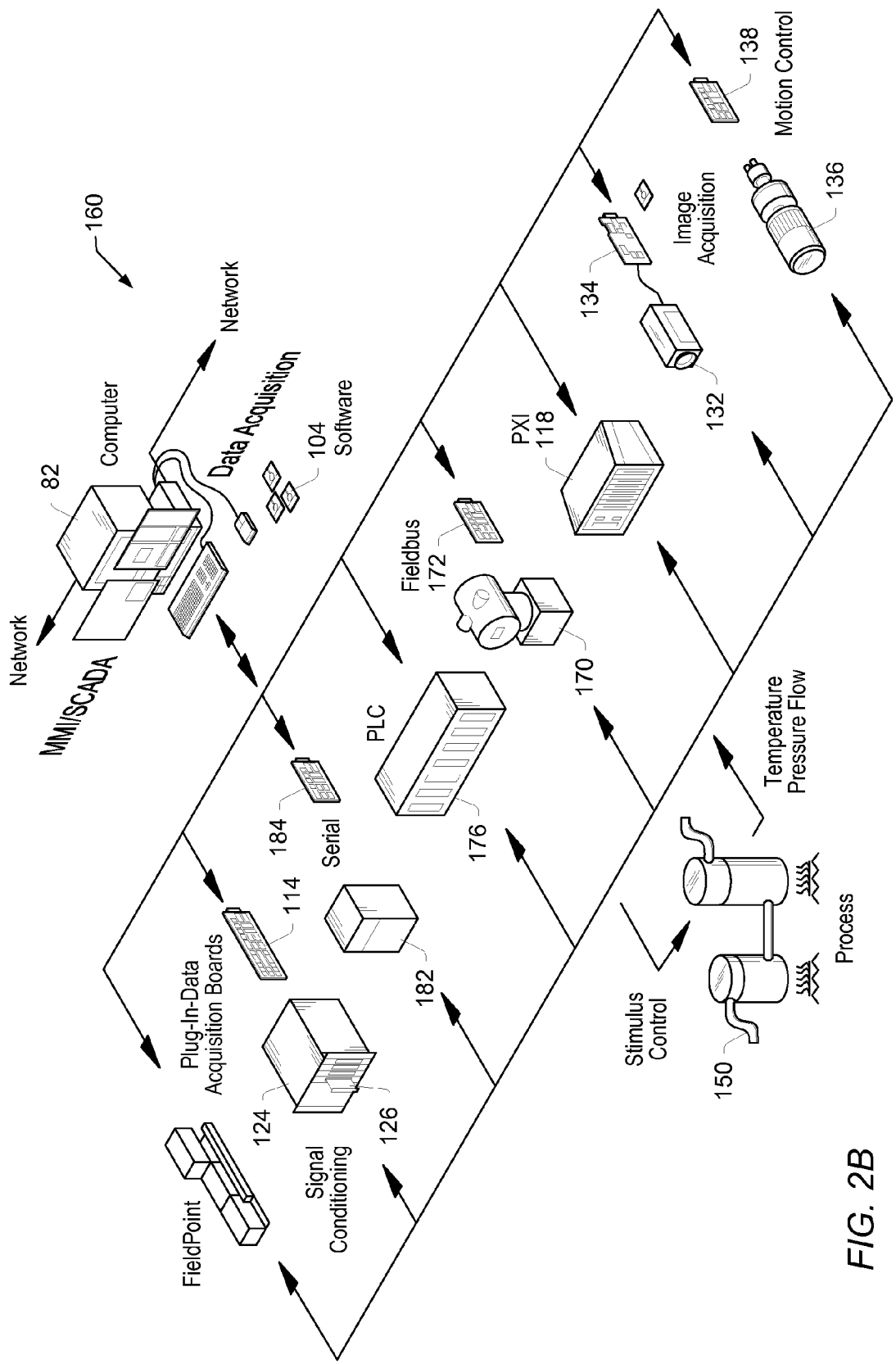
FIG. 2B illustrates an industrial automation system according to one embodiment of the invention.

FIG. 2B illustrates an exemplary industrial automation system 160 which may implement embodiments of the invention. The industrial automation system 160 is similar to the instrumentation or test and measurement system 100 shown in FIG. 2A. Elements which are similar or identical to elements in FIG. 2A have the same reference numerals for convenience. The system 160 may comprise a computer 82 which couples to one or more devices or instruments. The computer 82 may comprise a CPU, a display screen, memory, and one or more input devices such as a mouse or keyboard as shown. The computer 82 may operate with the one or more devices to a process or device 150 to perform an automation function, such as MMI (Man Machine Interface), SCADA (Supervisory Control and Data Acquisition), portable or distributed data acquisition, process control, advanced analysis, or other control, among others.

The one or more devices may include a data acquisition board 114 inserted into or otherwise coupled with chassis 124 with associated signal conditioning circuitry 126, a PXI instrument 118, a video device 132 and associated image acquisition card 134, a motion control device 136 and associated motion control interface card 138, a fieldbus device 170 and associated fieldbus interface card 172, a PLC (Programmable Logic Controller) 176, a serial instrument 182 and associated serial interface card 184, or a distributed data acquisition system, such as the Fieldpoint system available from National Instruments, among other types of devices.

Figure 3A:
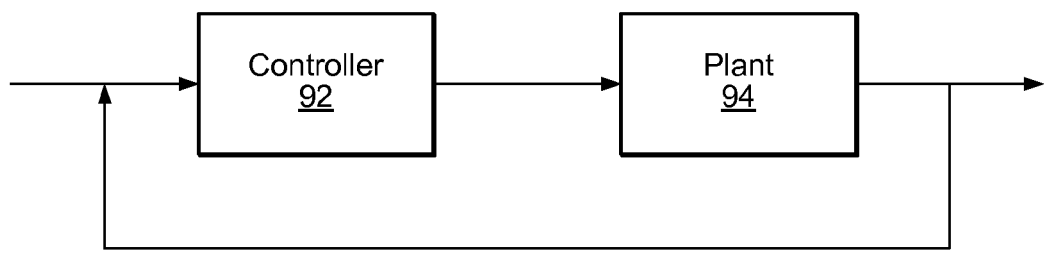
FIG. 3A is a high level block diagram of an exemplary system which may execute or utilize graphical programs.

FIG. 3A is a high-level block diagram of an exemplary system that may execute or utilize graphical programs. FIG. 3A illustrates a general high-level block diagram of a generic control and/or simulation system which comprises a controller 92 and a plant 94. The controller 92 represents a control system/algorithm the user may be trying to develop. The plant 94 represents the system the user may be trying to control. For example, if the user is designing an ECU for a car, the controller 92 is the ECU and the plant 94 is the car's engine (and possibly other components such as transmission, brakes, and so on.) As shown, a user may create a graphical program that specifies or implements the functionality of one or both of the controller 92 and the plant 94. For example, a control engineer may use a modeling and simulation tool to create a model (graphical program) of the plant 94 and/or to create the algorithm (graphical program) for the controller 92.

Figure 3B:
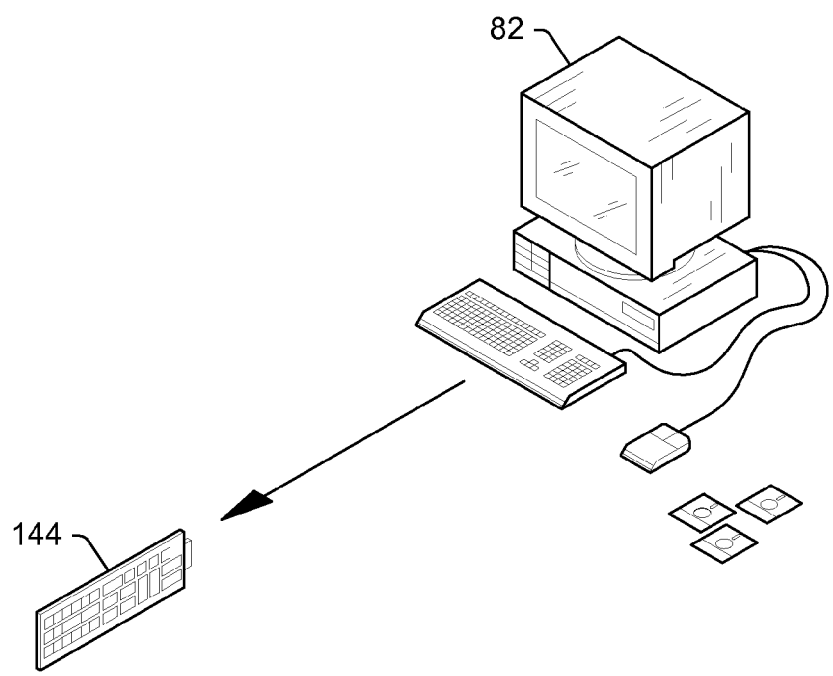
FIG. 3B illustrates an exemplary system which may perform control and/or simulation functions utilizing graphical programs.

FIG. 3B illustrates an exemplary system which may perform control and/or simulation functions. As shown, the controller 92 may be implemented by a computer system 82 or other device (e.g., including a processor and memory medium and/or including a programmable hardware element) that executes or implements a graphical program. In a similar manner, the plant 94 may be implemented by a computer system or other device 144 (e.g., including a processor and memory medium and/or including a programmable hardware element) that executes or implements a graphical program, or may be implemented in or as a real physical system, e.g., a car engine.

In one embodiment of the invention, one or more graphical programs may be created which are used in performing rapid control prototyping. Rapid Control Prototyping (RCP) generally refers to the process by which a user develops a control algorithm and quickly executes that algorithm on a target controller connected to a real system. The user may develop the control algorithm using a graphical program, and the graphical program may execute on the controller 92, e.g., on a computer system or other device. The computer system 82 may be a platform that supports real time execution, e.g., a device including a processor that executes a real time operating system (RTOS), or a device including a programmable hardware element.

In one embodiment of the invention, one or more graphical programs may be created which are used in performing Hardware in the Loop (HIL) simulation. Hardware in the Loop (HIL) refers to the execution of the plant model 94 in real time to test operation of a real controller 92. For example, once the controller 92 has been designed, it may be expensive and complicated to actually test the controller 92 thoroughly in a real plant, e.g., a real car. Thus, the plant model (implemented by a graphical program) is executed in real time to make the real controller 92 "believe" or operate as if it is connected to a real plant, e.g., a real engine.

In the embodiments of FIGS. 2A, 2B, and 3B above, one or more of the various devices may couple to each other over a network, such as the Internet. In one embodiment, the user operates to select a target device from a plurality of possible target devices for programming or configuration using a graphical program. Thus the user may create a graphical program on a computer and use (execute) the graphical program on that computer or deploy the graphical program, or a portion of the program, to a target device (for remote execution on the target device) that is remotely located from the computer and coupled to the computer through a network.

Graphical software programs which perform data acquisition, analysis and/or presentation, e.g., for measurement, instrumentation control, industrial automation, modeling, or simulation, such as in the applications shown in FIGS. 2A and 2B, may be referred to as virtual instruments.

Figure 4:
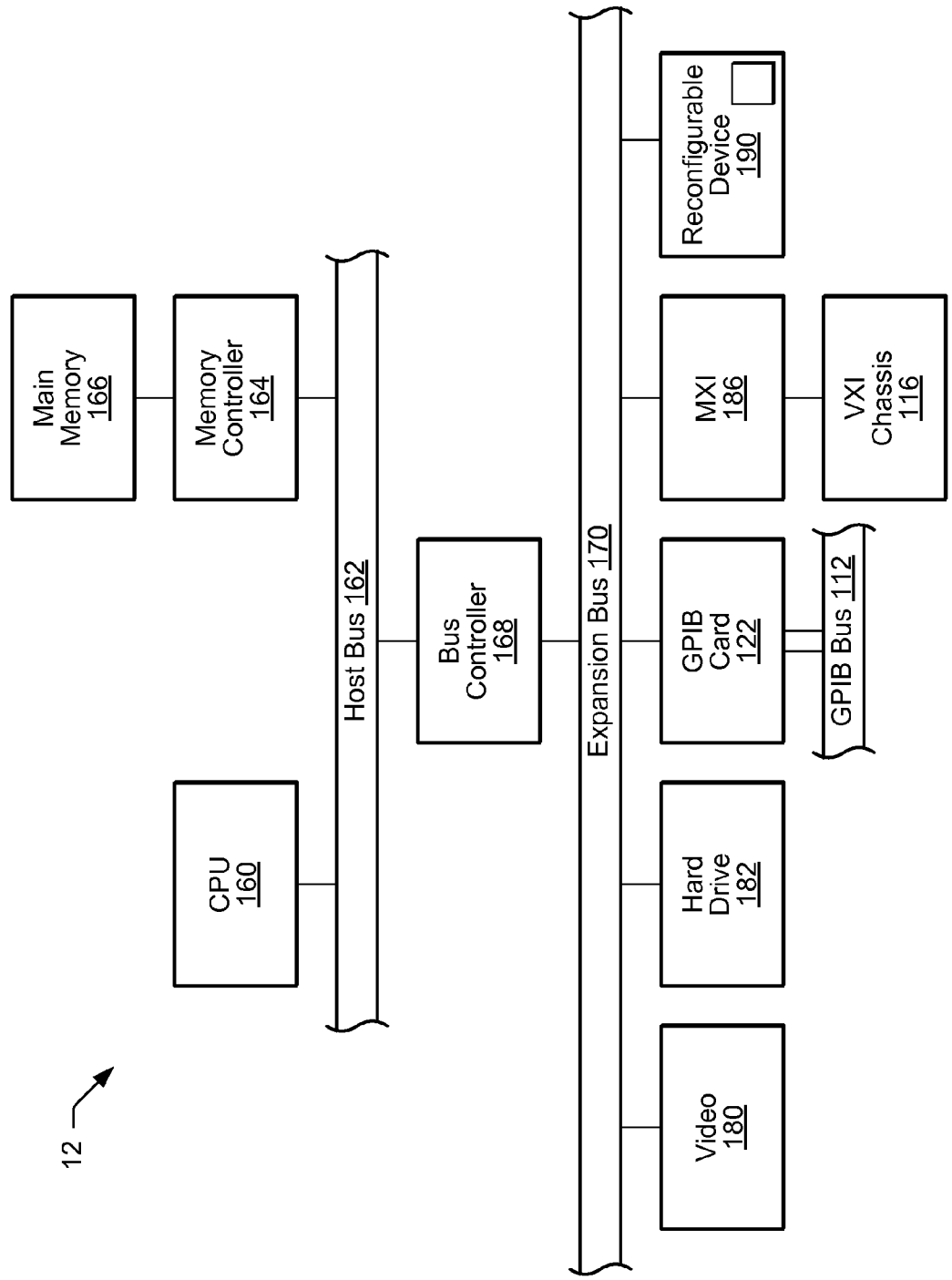
FIG. 4 is an exemplary block diagram of the computer systems of FIGS. 1A, 1B, 2A and 2B and 3B.

FIG. 4—Computer System Block Diagram

FIG. 4 is a block diagram representing one embodiment of the computer system 82 and/or 90 illustrated in FIG. 1, or computer system 82 shown in FIG. 2A or 2B. It is noted that any type of computer system configuration or architecture can be used as desired, and FIG. 4 illustrates a representative PC embodiment. It is also noted that the computer system may be a general-purpose computer system, a computer implemented on a card installed in a chassis, or other types of embodiments. Elements of a computer not necessary to understand the present description have been omitted for simplicity.

The computer may include at least one central processing unit or CPU (processor) 160 which is coupled to a processor or host bus 162. The CPU 160 may be any of various types, including an x86 processor, e.g., a Pentium class, a PowerPC processor, a CPU from the SPARC family of RISC processors, as well as others. A memory medium, typically comprising RAM and referred to as main memory, 166 is coupled to the host bus 162 by means of memory controller 164. The main memory 166 may store the graphical program operable to be distributed across multiple execution targets, as well as a development environment for creating the graphical program, and for specifying its distribution over multiple execution targets. The main memory may also store operating system software, as well as other software for operation of the computer system.

The host bus 162 may be coupled to an expansion or input/output bus 170 by means of a bus controller 168 or bus bridge logic. The expansion bus 170 may be the PCI (Peripheral Component Interconnect) expansion bus, although other bus types can be used. The expansion bus 170 includes slots for various devices such as described above. The computer 82 further comprises a video display subsystem 180 and hard drive 182 coupled to the expansion bus 170.

As shown, a device 190 may also be connected to the computer. The device 190 may include a processor and memory which may execute a real time operating system. The device 190 may also or instead comprise a programmable hardware element. The computer system may be operable to deploy a graphical program, or a portion of a graphical program, to the device 190 for execution of the graphical program on the device 190. The deployed graphical program may take the form of graphical program instructions or data structures that directly represents the graphical program. Alternatively, the deployed graphical program may take the form of text code (e.g., C code) generated from the graphical program. As another example, the deployed graphical program may take the form of compiled code generated from either the graphical program or from text code that in turn was generated from the graphical program.

Figure 5:
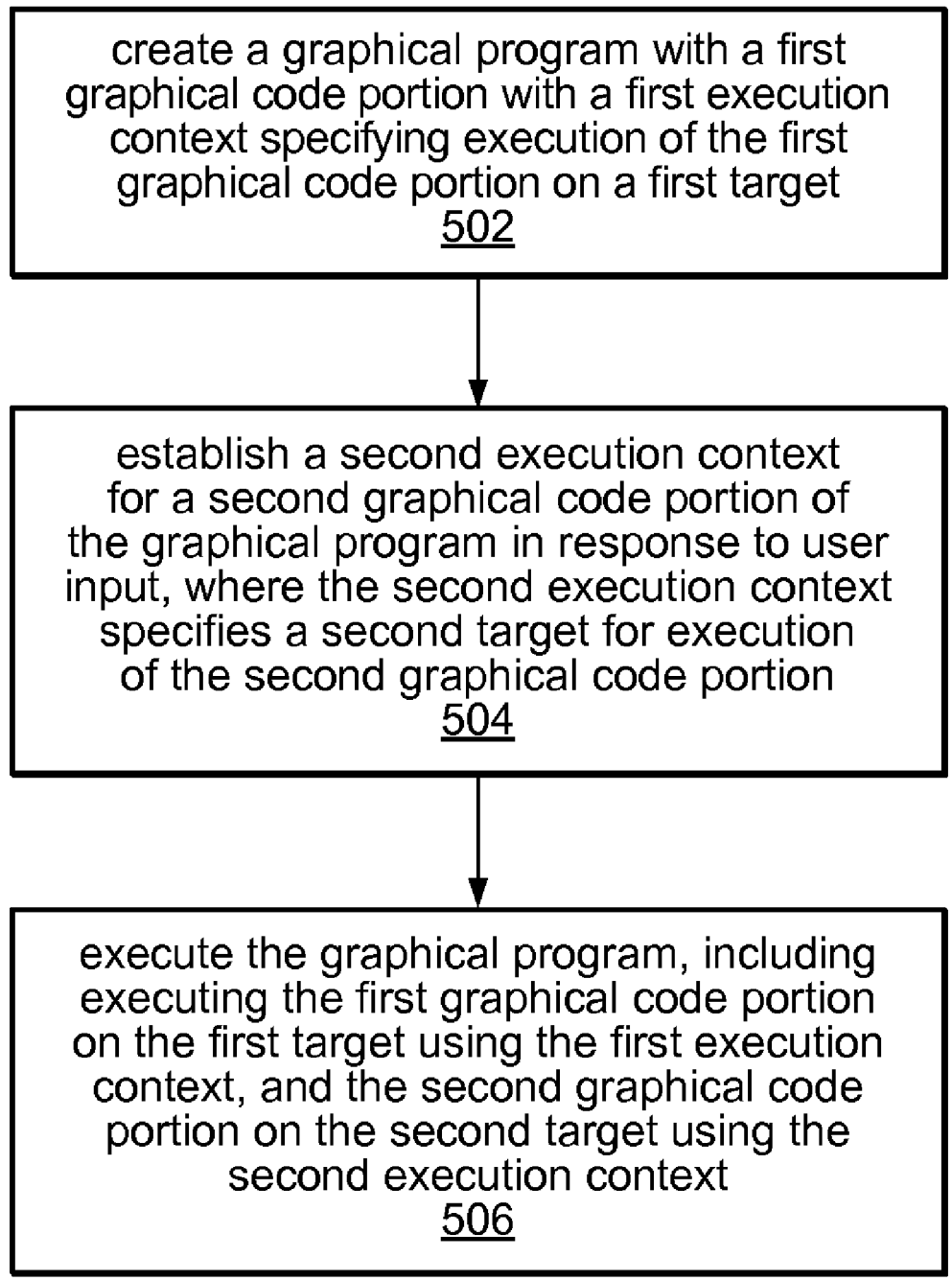
FIG. 5 is a flowchart diagram illustrating one embodiment of a method for creating a graphical program on a display having portions that execute on different targets.

FIG. 5—Flowchart of a Method for Creating a Graphical Program with Portions That Execute on Different Targets FIG. 5 illustrates one embodiment of a method for creating a graphical program on a display having portions that execute on a first target and a second target. The method shown in FIG. 5 may be used in conjunction with any of the computer systems or devices shown in the above Figures, among other devices. In various embodiments, some of the method elements shown may be performed concurrently, in a different order than shown, or may be omitted. Additional method elements may also be performed as desired. As shown, this method may operate as follows.

First, in 502 a graphical program may be created on the computer system 82 (or on a different computer system), e.g., in response to user input. The graphical program preferably is a graphical data flow program, although in other embodiments, the graphical program may be another type of flow diagram, such as a control flow, or execution flow diagram. The graphical program may be created or assembled by the user arranging on a display a plurality of nodes or icons and then interconnecting the nodes to create the graphical program. In response to the user assembling the graphical program, data structures may be created and stored which represent the graphical program. The nodes may be interconnected in one or more of a data flow, control flow, or execution flow format. The graphical program may thus comprise a plurality of interconnected nodes or icons that visually indicates the functionality of the program. The graphical program preferably includes a first graphical code portion with a first execution context specifying execution of the first graphical code portion on the first target. The graphical program may be developed under a project (which itself may operate under a development environment), where the project is considered to reside and execute on a host system. The first execution context may specify the host system as the execution target for the first graphical code portion, or may specify a different target for execution of that code.

As noted above, the graphical program may comprise a block diagram and may also include a user interface portion or front panel portion. Where the graphical program includes a user interface portion, the user may optionally assemble the user interface on the display. As one example, the user may use the LabVIEW graphical programming development environment to create the graphical program.

In an alternate embodiment, the graphical program may be created in 502 by the user creating or specifying a prototype, followed by automatic or programmatic creation of the graphical program from the prototype. This functionality is described in U.S. patent application Ser. No. 09/587,682 titled "System and Method for Automatically Generating a Graphical Program to Perform an Image Processing Algorithm", which is hereby incorporated by reference in its entirety as though fully and completely set forth herein. The graphical program may be created in other manners, either by the user or programmatically, as desired. The graphical program may implement a measurement function, an automation function, or a control function, among others, as desired.

As used herein the term "execution context" refers to a data structure (or a plurality of data structures) used to run an execution system. For example, there may be an execution context for each execution thread in which a graphical program or graphical program portion or section is executed. Each thread may call an Exec( ) function (or equivalent) with a pointer to an execution context for that thread.

In one embodiment, graphical code may be compiled into code sections each of which includes no parallelism, although it should be noted that multiple code sections may be executed in parallel, e.g., via threads running in parallel. An execution context preferably includes (among other items), a designation or specification of a target, i.e., an execution target for executing graphical code associated with the execution context. For example, the specification may include a network address of a remote execution platform, or a CPU (central processing unit) number, e.g., in a multi-processor system, among others. In one embodiment, an execution context may also include a run queue of queue elements (e.g., a pointer to a run queue), each of which represents a respective code section, as well as a pointer to (or other designation of) the currently executing queue element representing the currently executing code section.

Note that while there is generally an execution context per thread, different execution contexts may share run queues. Thus, a run queue may include a plurality of executable code sections from which one or more execution contexts can pull code sections for execution by respective threads. Note that, depending on the number of processors in the system, the threads may execute their respective code sections in parallel. Each queue element may include a pointer into the code section (i.e., a code pointer or program counter), comprising an address for the next instruction to execute, as well as a pointer to (or other indication of) a data space associated with code. To execute the code section, a register is loaded with the data space pointer, and the compiled code references the data via the data space pointer. Note that a code section may return from execution before the entire code section is executed, where the current code address (code pointer or program counter) points to the next instruction to be executed. The queue element may be placed back into the run queue, and subsequently pulled by an execution context for continued execution by a thread, where the code section resumes execution at the address indicated by the code pointer or program counter. Note that in some embodiments, each section of graphical code may be targeted to an arbitrary subset of targets, e.g., CPUs, and the program schedulers (execution scheduling processes) may use any scheduling algorithms as desired to assign a thread to a particular CPU.

It should be noted that any type of execution target or platform may be designated for use by the execution context, i.e., any computing elements capable of executing code may be targeted as desired. Exemplary execution targets may include, for example, CPU-based systems, programmable hardware elements, e.g., field programmable gate arrays (FPGAs), digital signal processors (DSPs), micro-controllers, etc., as well as any combinations of the above, among others. For example, a target may include one or more FPGAs and one or more DSPs that may operate in conjunction.

In 504, a second execution context for a second graphical code portion of the graphical program may be established in response to user input, where the second execution context specifies or indicates the second target for execution of the second graphical code portion of the graphical program. In one embodiment, establishing the second execution context may include displaying a context structure on the display in response to user input, where the context structure specifies or indicates the second execution context for graphical program code associated with the context structure. In various embodiments, the context structure may be any of various types of structure. For example, the context structure may be a timed structure, such as a timed loop structure or a timed sequence structure. For further details regarding timed loops, please see U.S. patent application Ser. No. 10/892,829, titled "A Graphical Program Which Executes a Timed Loop", which was incorporated by reference above. In one embodiment, the context structure may be a node structure that only or primarily specifies and manages execution of associated graphical code in an execution context, i.e., on a designated execution target. In some embodiments, the context structure may be considered an execution "portal", where graphical code displayed in a graphical program executing on a first target may be executed on a second target via the "portal", i.e., remotely, even though the code is still displayed in the "local" graphical program.

Figure 6:
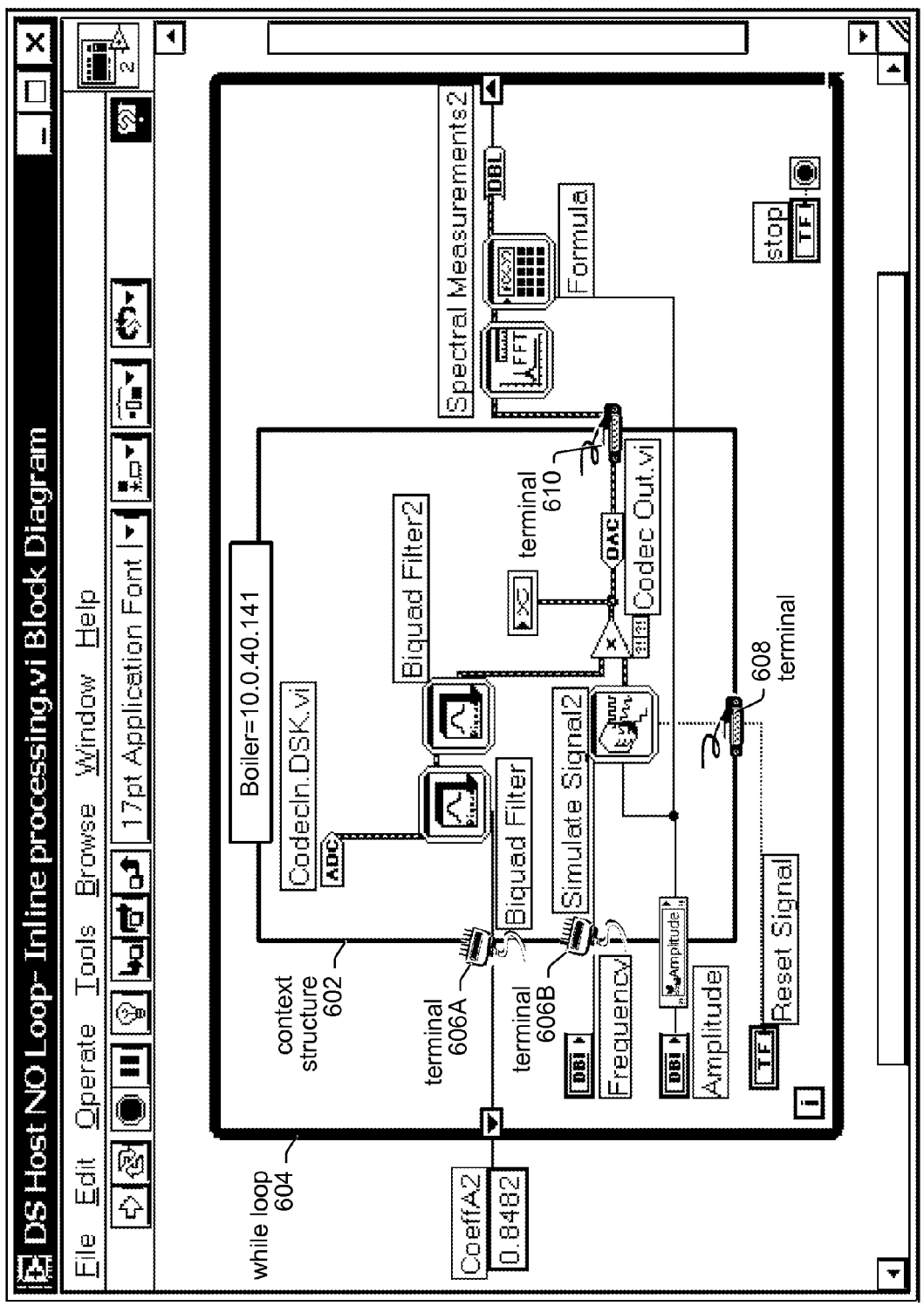
FIG. 6 illustrates an exemplary graphical program with an execution context structure, according to one embodiment.

FIG. 6 illustrates an exemplary graphical program that includes a context structure 602 (inner rectangle), labeled "Boiler=10.0.40.141", enclosing an example graphical code segment, and a while loop structure 604 (outer rectangle) that implements or manages iterative execution of the graphical program. As indicated, in this case, the context structure is configured to execute the enclosed graphical code on an execution platform or target at the indicated network address (10.0.40.141). As FIG. 6 shows, the enclosed graphical segment includes various graphical program nodes, including a Biquad Filter, so labeled, a second Biquad Filter, labeled "Biquad Filter2", a simulation node, labeled "Simulate Signal2", a multiply node—a triangle labeled with a "x", an analog to digital (ADC) node labeled "CodecIn.DSK.vi", and a digital to analog (DAC) node labeled "Codec Out.vi". Additional graphical program code resides outside the context structure, such as, for example, various numeric data nodes, labeled "CoeffA2", "Frequency", "Amplitude", etc., as well as a Fast Fourier Transform (FFT) node, so labeled, and an analysis node labeled "Formula", among others.

As may be seen, the context structure may include one or more configurable terminals for communication between graphical code inside the context structure and graphical code (or external elements or systems, including the user) outside the context structure. For example, in the embodiment shown, terminals 606A and 606B, here represented by terminal icons located on the left border of the context structure, may facilitate communication of the CoeffA2 and Frequency numeric values to nodes inside the context structure. Similarly, terminal 608 may allow communication of a reset signal, e.g., input by a user via a front panel, to the Simulate Signal2 node inside the context structure. Finally, as shown, in this embodiment, a terminal 610 may provide for communication of output data from inside the context structure to the outer nodes, e.g., the FFT node.

The second graphical code portion may be associated with the context structure in response to user input. This association may be made via any of a number of ways. For example, in one embodiment, the user may drag and drop the second graphical code portion into the context structure using a pointing device, such as a mouse. In another exemplary embodiments, the user may draw the context structure around the second graphical code portion. For example, the user may invoke a special mode, e.g., a drawing mode or equivalent, and simply draw a boundary, e.g., a polygon, circle, or freehand border, around the second graphical code portion. In one embodiment, the user may "drag" a (rectangular) bounding box (or circle or ellipse) around the code portion. Of course, any other means for associating the code portion with the context structure may be used as desired. For example, in one embodiment, the user may invoke a menu on the code portion and/or the context structure, and may specify the association via menu selection. In another embodiment, the user may invoke an association wizard, where the wizard leads the user through the association process via a number of dialogs, whereby the user provides input specifying the association.

In one embodiment, establishing the second execution context may include configuring the context structure. Of course, any of various means may be used to configure the context structure. For example, the user may interact with a dialog box, property page, menu(s), or wizard to statically configure the context structure, e.g., the user may invoke a configuration dialog by invoking a "Configure" option (or its equivalent) on a context menu for the context structure or a configuration node, or by double-clicking on the border of the structure or the configuration node. The user may then interact with the configuration dialog to specify information such as the execution target. In one embodiment the user may utilize the configuration dialog to specify other properties of the context structure as well, such as a structure name, and/or other information that may be useful for managing the context structure.

Thus, in one embodiment, establishing the second execution context may include invoking a graphical user interface (GUI) with respect to the context structure, receiving user input to the GUI specifying the second execution context for the second graphical code portion, including specifying the second target for execution of the second graphical code portion, and automatically configuring the second execution context in accordance with the user input to the GUI. In various embodiments, the GUI may include one or more of: one or more dialogs, one or more property pages, one or more menus, and/or a wizard. For example, a configuration dialog or menu (or wizard) may be invoked on the context structure, e.g., via a project or environment menu or dialog invocation, which would be a static assignment of the configuration parameters. In one embodiment, automatically configuring the second execution context may include one or more of: creating a project, adding computing nodes to the graphical program, creating new nodes for the graphical program, creating new block diagrams for inclusion in the graphical program, copying one or more block diagrams in the graphical program, downloading one or more portions of the graphical program to an execution context, and/or adding variable configuration to the graphical program.

Thus, in some embodiments, the execution context may be configured through the project in which the graphical program is developed. For example, the type and/or definition of the target may be defined in the project under which the graphical program with the context structure is specified.

Since this configuration may occur at the project level, edit-time functionality regarding the graphical code associated with the execution context, e.g., included in the context structure, may be contingent upon the specified target. In other words, the editing environment and/or graphical program code, e.g., nodes, may adapt to the target specification in the project. For example, editing behavior within the context structure may be based on the type and configuration information of the specified target. In other words, the editing environment behavior may be automatically customized based on the target definition of the context structure (the target of the execution context). The environment or editor may provide help information, hints, and feedback to the user while the user is building/writing the code within the execution structure node. In one embodiment, the editor may prevent users from designing and building applications that cannot run on the specified target. For example, in one embodiment, the editor may flag errors when the user attempts to add or use nodes (functions) within the context structure that are not supported by, appropriate for, or relevant to, the specified target. In other words, the editor may enforce target specific syntax and semantic checking within the context structure.

As another example, in some embodiments, palettes from which the user may select (e.g., drag and drop) nodes for inclusion in the context structure may automatically present or display only those nodes or functions that are supported by or appropriate for the target. Alternatively, or additionally, the palettes may display all nodes available, but only allow supported or appropriate nodes to be included in the graphical code section in the context structure.

As a further example, the target specific environment or editor customization may include automatically locating and using correct instances of target specific libraries for built-in and user-defined functions (e.g., subVIs). For example, in an exemplary case, a user may drop a function called FFT (Fast Fourier Transform) into a context structure. If the target happens to require a specific implementation of the FFT function, e.g., an FPGA-specific implementation, the editor may retrieve the specific implementation instead of a generic version. In one embodiment, the visual appearance of the graphical code within the context structure may be specific to the specified target. For example, graphical program nodes directed to an FPGA may have different icons, labels, colors, etc., from those directed to a standard CPU based system.

In some embodiments, compilation and code generation with respect to the graphical program may be specific to the specified target. In other words, the graphical code associated with the context structure may be compiled in a manner that is specific to the target. Similarly, any code, e.g., C/C++ code, generated from the graphical code in the context structure may be specific or directed to the specified target. Moreover, in one embodiment, the environment and/or context structure may automatically manage elements external to the graphical program that portions of the graphical code within the context structure may be dependent on. In other words, in some embodiments, the graphical code within the context structure node may refer to external elements, e.g., to dynamic link libraries (DLLs), configuration files or variables (that are defined externally), hardware configurations, and/or other external entities, i.e., the graphical code section within the context structure may not be completely self contained, but rather may include references to entities or elements that are defined outside the graphical code section, or even the entire graphical program. In other words, the external entities are "used" within the graphical code section. These external elements or entities may be referred to as "dependencies", and may be required to be present in correct form at the target for the target to be able to execute the code. Thus, in some embodiments, the context structure and/or the environment may find such dependencies and compile and deploy the external dependencies accordingly.

In some embodiments, if some aspect of the context structure, graphical program distribution, or editor/environment configuration or functionality is ambiguous, the user may be automatically prompted to provide additional information or instructions to resolve the ambiguity.

Alternatively, or additionally, in some embodiments, the context structure may be configured dynamically, i.e., at or during runtime. For example, in one embodiment, the at least one graphical program element may include a front panel communicatively coupled to the context structure. The front panel may dynamically receive user input specifying the configuration information for the context structure, and may provide the configuration information to the context structure to configure the context structure. For example, the front panel may be coupled to the graphical program via a terminal, e.g., a front panel terminal, which may couple to the context structure via a terminal, e.g., a configuration or communication terminal, included in or on the context structure.

In some embodiments, establishing the second execution context may include connecting at least one graphical program element to the context structure, and the at least one graphical program element providing configuration information to the context structure, thereby configuring the context structure, where the configuration information includes a specification or designation of the second target for execution of the second graphical code portion of the graphical program. For example, in some embodiments, configuring the context structure may include connecting one or more wires to one or more terminals associated with the context structure in response to user input, where the one or more wires specify the configuration information. In other words, the wires may be operable to store and communicate the configuration information to the context structure. Said another way, the context structure may include one or more terminals to which the user can connect a wire or wires specifying the configuration information. For example, in one embodiment, the context structure may include an input node, also referred to as a configuration node, where the input node includes various terminals to which the user may connect wires to dynamically set the respective properties during execution of the graphical program. For example, a specific terminal may represent the specification or designation of the execution target for the context structure. Thus, the user can connect a wire to this terminal to specify the target for the context structure. The input node may also include other terminals for connecting wires to dynamically specify other aspects of the context structure. For example, in the case where the context structure is a timed loop, the terminals may be used to specify the loop's timing source, priority, offset, mode, and other timing information.

In some embodiments, the at least one graphical program element may include a node coupled to the context structure, where providing configuration information to the context structure may include the node providing the configuration information to the context structure to configure the context structure in accordance with attributes of the node. For example, a property node may be coupled to the context structure, where the property node includes one or more configuration parameter values for configuring the context structure. Similarly, a data node may be coupled to the context structure, where the data node provides configuration information to the context structure (thereby configuring the structure).

In one embodiment the user may have the option to set properties of the context structure both statically, e.g., by using a configuration dialog, menu, property page, etc., and dynamically by connecting wires to terminals on the block diagram of the graphical program. For example, in one exemplary embodiment, checking a "Use terminal" checkbox for one or more properties or attributes on a configuration dialog may cause the corresponding terminals to appear in the input (i.e., configuration) node for the context structure. The user may then connect wires to the terminals in the input or configuration node of the context structure to cause the respective properties to be set dynamically during execution of the graphical program. Thus, the user can connect wires to respective terminals for these properties to cause the properties to be set dynamically during execution of the graphical program, whereas other properties for the context structure may be statically configured through the configuration dialog or other GUI means.

In some embodiments, if the user configures one or more properties for the context structure (e.g., the execution target, name, etc.) using the configuration dialog then the specified values may appear in the configuration node of the context structure. This allows the user to see how the context structure is configured by simply looking at the block diagram of the graphical program, i.e., by looking at the configuration node of the context structure, as opposed to the user being required to invoke a dialog or other window to view the configuration information.

Thus in one embodiment the configuration node may display terminals for specific properties that the user requests (e.g., by checking a "Use terminal" checkbox in a configuration dialog as described above), where the user can connect wires to the terminals to cause the respective properties to be dynamically set. The configuration node may also display values for statically configured properties of the context structure, where the values were specified using a configuration dialog as described above. For example, the configuration node may include a plurality of displayed rows or fields, where each row or field represents one of the properties of the context structure. Some of the rows or fields, i.e., the ones corresponding to properties that are set dynamically, may visually indicate that they are terminals to which the user can connect wires. Other rows or fields, i.e., the ones corresponding to properties that are statically configured through the configuration dialog, may simply display the value specified by the user but may not visually indicate that they are terminals to which the user can connect wires.

However, in one embodiment the user may still be able to connect a wire to a row or field corresponding to a property that is statically configured, even though the row or field may not currently include or may not visually indicate a terminal for connecting a wire. The act of connecting a wire to the row or field may cause the row or field to change so that it includes or visually indicates a terminal. Thus, the respective property may be automatically changed from a statically configured property to a property that is dynamically set by data from the connected wire.

In one embodiment the user may also be able to configure how information in the configuration node is displayed. For example, the user may configure the properties shown in the configuration node to be represented either iconically and/or textually. In one embodiment each row or field in the configuration node may by default display a small icon that visually represents the respective property of the context structure. For example, in one embodiment where the context structure is a timed loop, a clock icon may represent the timing source of the context structure, and a staggered "3, 2, 1" icon may represent the priority of the context structure, etc. The user may be able to request that text names for the properties be displayed in addition to or instead of the icons, e.g., by selecting a menu item from a context menu for the configuration node.

Also, in one embodiment the user may be able to specify which properties of the context structure to show in the configuration node. For example, the user may want some of the properties to be displayed and others to be hidden to avoid clutter on the block diagram. In various embodiments the user may be able to specify which properties to show in the configuration node in any of various ways. For example, the user may be able to request that only the properties that are dynamically set, i.e., the ones to which wires are connected, be shown in the configuration node, or the user may interact with a dialog box to check boxes to specify which properties to show or hide.

In a further embodiment, the context structure may be configured via a call from a calling or parent program, which is another example of dynamic configuration. For example, in one embodiment, the context structure (and its contents) may be represented by a node in the graphical program, i.e. may be represented by a subVI (node), which, when executed in the graphical program, calls the context structure, much as a standard text-based program makes a function call by name, thereby invoking the program code of the function. Providing the configuration information to the context structure may thus include the node making a call to the context structure, and passing the configuration information to the context structure. For example, executing the subVI to call or invoke the context structure may include passing a designation or specification of the execution target to the context structure, in response to which the context structure and its contents may then execute on that target. In one embodiment, the configuration of the context structure (or the context structure itself) may be automatically set to that of the calling program or node, e.g., using a "same as caller" scheme.

In some embodiments, the block diagram or graphical program portion called by and represented by the subVI node, referred to herein as a sub-block diagram, sub-diagram, or sub-graphical program, may have an implicit context structure, i.e., where some or all of the configurable properties of the context structure are properties of the sub-diagram, thus obviating the need for an explicit context structure. In other words, in some embodiments, a sub-diagram may be considered to have or be its own context structure, i.e., the boundary of the sub-diagram may itself be considered to be a context structure. Said another way, the configuration of the execution context for the sub-diagram may be performed by configuring the sub-diagram directly, either statically or dynamically, as desired.

Note that in some embodiments, if the parent program's execution context is the same as that of the called subVI or context structure, the context structure may be "short circuited", i.e., may be omitted or rendered inoperable, since the functionality of the context structure is then superfluous.

Thus, the method may include configuring the context structure statically, i.e., at compile or edit time of the graphical program, and/or may include re-configuring the context structure dynamically at or during runtime of the graphical program.

It should be noted that such dynamic configuration may facilitate configuring the graphical program to dynamically change the configuration information for the context structure during execution of the graphical program, e.g., in response to user input, or programmatically. For example, by transmitting the configuration information to the context structure dynamically, e.g., via wires coupled to the context structure, the execution target for the context structure may be changed per iteration or execution of the code section included in the context structure. In other words, one or more terminals for dynamically changing the configuration information for the context structure may be associated with the context structure, where configuring the graphical program to dynamically change the configuration information for the context structure may include connecting one or more wires to the one or more terminals in response to user input. The context structure may then receive the configuration information dynamically, thereby configuring the context structure at or during runtime.

For example, in one embodiment, the context structure may include special data nodes that may be utilized for this purpose, e.g., the context structure may have a left data node attached to the left border of the context structure and a right data node attached to the right border of the context structure. In embodiments where the context structure is a timed loop structure, the left data node may provide configuration (e.g., timing) and status information about the current and/or previous loop iteration, including an execution target specification or designation. The user can wire data from the left data node to the right data node to cause future iterations of the context structure to be dynamically configured during execution of the graphical program, e.g., possibly changing the execution target from one iteration to the next.

In various embodiments the left data node may return any kind of data regarding execution of the context structure, e.g., data regarding execution of the previous iteration of the context structure or data specifying current property values, such as the current execution target, priority, etc., of the context structure (or any other information associated with the particular type of context structure used, e.g., timed loop properties and status information). In one embodiment the left data node may include a plurality of terminals, each corresponding to a different data item. For example, each data item may be represented as a separate row or field in the left data node. The user may be able to configure the left data node to display only the data items of interest, similarly as described above with reference to the configuration node, as noted above.

The user may connect wires to the terminals of the left data node to receive the respective values of the data items. The wires may provide the data item values to other nodes within the context structure and/or to the right data node. As one simple example, the user may connect one end of a wire to a terminal in the left data node to receive the current execution target of the context structure and may connect the other end of the wire to a data node within the context structure border. The data node may be configured to provide a next execution target, e.g., from a list of execution targets, and the node may be connected to an appropriate terminal in the right data node. (The right data node may include a plurality of terminals corresponding to various data items regarding execution of the context structure, similarly as described above for the left data node.) Thus, in this simple example, the execution target of the context structure may be dynamically set on each loop iteration. Future scheduling of the context structure may take the dynamically changed context structure properties into account, i.e., so that subsequent iterations of the context structure execute according to a new dynamically specified execution target, priority, etc.

In one embodiment, the context structure may be operable to pass on error or status information to other nodes in the graphical program. For example, the context structure may include an output node, that may be operable to return error information that the context structure receives, e.g., in an "Error In" input of an input node for the structure, or to return error information that the context structure itself generates during execution. For example, in one embodiment, if an external source causes the execution of the context structure to abort then the output node may return an error. In one embodiment, the output node may not return error information from any sub-diagram that executes within the context structure. In one embodiment, if the context structure receives an error, e.g., in the "Error In" input of the input node, then the context structure may not execute (i.e., the graphical source code associated with the context structure may not be executed), and the context structure may simply pass on the error.

Thus, in some embodiments, one or more nodes associated with the context structure may be configured to receive information regarding a previous iteration or execution of the context structure during execution of the graphical program, e.g., in response to user input or programmatically. Similarly, one or more terminals for dynamically receiving information regarding a previous iteration of the context structure may be associated with the context structure, where configuring the one or more nodes to receive the information may include connecting the one or more nodes to the one or more terminals, e.g., in response to user input, or programmatically.

Thus, configuration of the execution context may be performed via various means. More specifically, as described above, target definition or specification may be provided at several levels, such as by the project, by the context structure, dynamically by connecting wires to the context structure, and/or by a function call (a subVI call).

In some embodiments, the context structure may also determine or manage how graphical code within the context structure (either in compiled form or in source form) is deployed to the target, along with its dependencies (i.e., dependent external elements or entities). In the simplest case, deployment may simply mean copying the code to the target. However, depending on the target, deployment may be more complex. For example, while for some targets, the code may need to be copied to a hard drive of the target, while for other, e.g., embedded controllers, the code may need to be burned in to flash (non volatile RAM). Moreover, if the target is remote, it may be required to send the code to the target over the bus to which the target is coupled, e.g., the target may be connected to the host via a serial, Ethernet, PCI, or PCI express, bus, among others, and the context structure may automatically deploy the code appropriately, depending on the particular target for the code. Thus, for example, in the case that the specified target is an FPGA, the context structure may manage the deployment (and possibly creation) of a hardware configuration file or netlist implementing the graphical code onto the FPGA. In other words, the context structure may deploy the graphical code (or code derived from the graphical code) to the target in an appropriate manner, depending on the nature of the target.

In one embodiment, the context structure may also be operable to manage communications with respect to the graphical code inside the context structure, e.g., between the graphical code inside the structure and elements outside the structure. For example, the context structure may determine and manage how parameters are passed based on the configuration of the terminals of the context structure, e.g., whether the parameters are passed by reference or by value.

Note that in some embodiments, the terminal configuration of the context structure may redefine the nature of the wires that are connected to those terminals. For example, a terminal of the context structure may be configured for synchronous or asynchronous communications, where a wire connected to that terminal may then automatically be defined (or re-defined) as a synchronous or asynchronous wire, accordingly. As an example, say node A is connected to node B through a wire. If the wire is a synchronous wire, then data flow protocol will be followed, such that node A, which provides data to the wire for transmission to node B, must finish executing and produce a value on the wire before node B can start running. In contrast, if the wire is an asynchronous wire, then node A and node B can run simultaneously, regardless of each other's execution state. Thus, if the configuration of the context structure terminal defines the incoming wire to be asynchronous, the context structure can start executing immediately, and does not have to wait until the input is available on the wire. For further information regarding asynchronous wires, please see co-pending U.S. patent application Ser. No. 11/462,393, titled "Asynchronous Wires in a Graphical Programming System", incorporated by reference above.

In some embodiments, configuring the context structure may include specifying, and possibly restricting, resources to be used when running the code under or on the target. For example, the context structure may allow specification of the number of CPUs to utilize on the target, or the particular CPU(s) to use, e.g., to use only one CPU on the target. As another example, the context structure may allow specification of how much bandwidth of a processor or CPU to use in executing on the target. As yet another example, the user may be able to specify (via the context structure configuration) how much RAM (random access memory) to use on the target. Of course, in other embodiments, any other type of resource use specification or management for the specified target may be configured as desired. Thus, target resource allocation and use may be configured and managed or implemented via the context structure.

In one embodiment, the first execution context mentioned above may include a default execution context for the graphical program. In other words, in contrast with the second execution context, whose configuration is described above according to various approaches, the first execution context may have a default configuration, and thus, may not need to be configured by the user. Of course, in other embodiments, the first execution context may be configured using any of the approaches described above, among others.

Finally, in 506, the graphical program may be executed, where during execution of the graphical program, the first graphical code portion executes on the first target using the first execution context, and the second graphical code portion executes on the second target using the second execution context. Thus, the context structure may be operable to invoke execution of the second graphical code portion on the specified second target, thereby causing the second graphical code portion to run on the second target, while the first graphical code portion executes on the first target (in accordance with the first execution context).

In some embodiments, the binding between the two portions may be such that one may execute even when the other is inoperable. For example, the first and second code portions may be loosely bound such that the first code portion can execute when the second code portion is inoperable. Thus, even if the second graphical code portion fails to execute on the second target, e.g., due to inoperable code in the second graphical code portion, or due to the context structure not being able to attach or be associated with the execution context, the first graphical code portion may continue to execute on the first target.

In one embodiment, the context structure may be operable to "re-attach" the project and/or graphical code executing on the host system to a running execution context or graphical code executing on a different target. For example, if the first target is considered to be the host system, where the first graphical code portion and the project is resident on the host system, the second graphical code portion may be executing on the second target when the project for the graphical program is closed (e.g., on the first target or host system). When the project is later opened or loaded (on the first target), the context structure may automatically re-attach the project, including the first graphical code portion, to the running execution context of the second target, i.e., to the second graphical code portion. Note that the re-attach process preferably puts the edit-time representation(s) of the second graphical code portion on the host system into the same state as the run-time version on the target. For example controls/indicators of the graphical program that include I/O for the second graphical code portion may update to the latest values on the target e.g., for the user to view.

As a more specific example, consider a main graphical program to be running on target A, where the graphical program has a context structure with a graphical code portion targeted to "target B". When the graphical code portions are running, the user can view the latest values on the controls/indicators of the graphical program on the host/development machine. The project may be closed, leaving the graphical code portions running on their respective targets. Upon subsequent opening of the project on the host system, the context structure may automatically detect that the graphical code portions are already deployed and running under the respective targets and so there is no need to do it again. The context structure may then re-connect/re-attach the project and/or any portion of the graphical program on the host system to the graphical code portions that are already running on the respective targets.

The context structure may also facilitate debugging of the code contained in the context structure, i.e., the second graphical code portion. For example, in preferred embodiments, all the standard debugging features may be available with respect to the graphical code in the structure. Examples of debugging features supported may include, but are not limited to, single stepping into the context structure from outside the context structure, stepping through functions or nodes within the context structure, and stepping out of the context structure, as well as such stepping into, over, and out of other nodes in the graphical program. Further examples of debugging features that may be supported include execution highlighting, and probes, e.g., conditional probes, which may be connected to or associated with wires (or nodes) in the graphical program to provide "debug out" functionality, i.e., to allow the user to view the value of data being stored or transmitted on the wire. Of course, any other debugging functionality used in programming, especially graphical programming, is also contemplated as being within the scope of the present invention. Note that in preferred embodiments, the debugging may be performed from the host computer, e.g., from the normal execution target of the graphical program, i.e., the first target. In other words, the second graphical code portion may run on the second target, but can be debugged by the user on the first target.

Thus, various embodiments of the present invention may facilitate distributed execution of portions of a graphical program on respective targets.

Described in a slightly different way, in one embodiment, a method for creating a graphical program on a display having portions that execute on a first target and a second target may include displaying a context structure on the display in response to user input, where the context structure indicates a first execution context for graphical program code associated with the context structure, and where the first execution context is a different execution context from other graphical program code in the graphical program. A first graphical code portion may be associated with the context structure in response to user input, and the first graphical code portion may be specified for execution on the first target. A second graphical code portion may be displayed on the display, where the second graphical code portion has a second execution context different from the first execution context, and where the second execution context specifies execution of the second graphical code portion on the second target. During execution of the graphical program on the second target, the first graphical code portion executes on the first target using the first execution context.

Figure 7A:
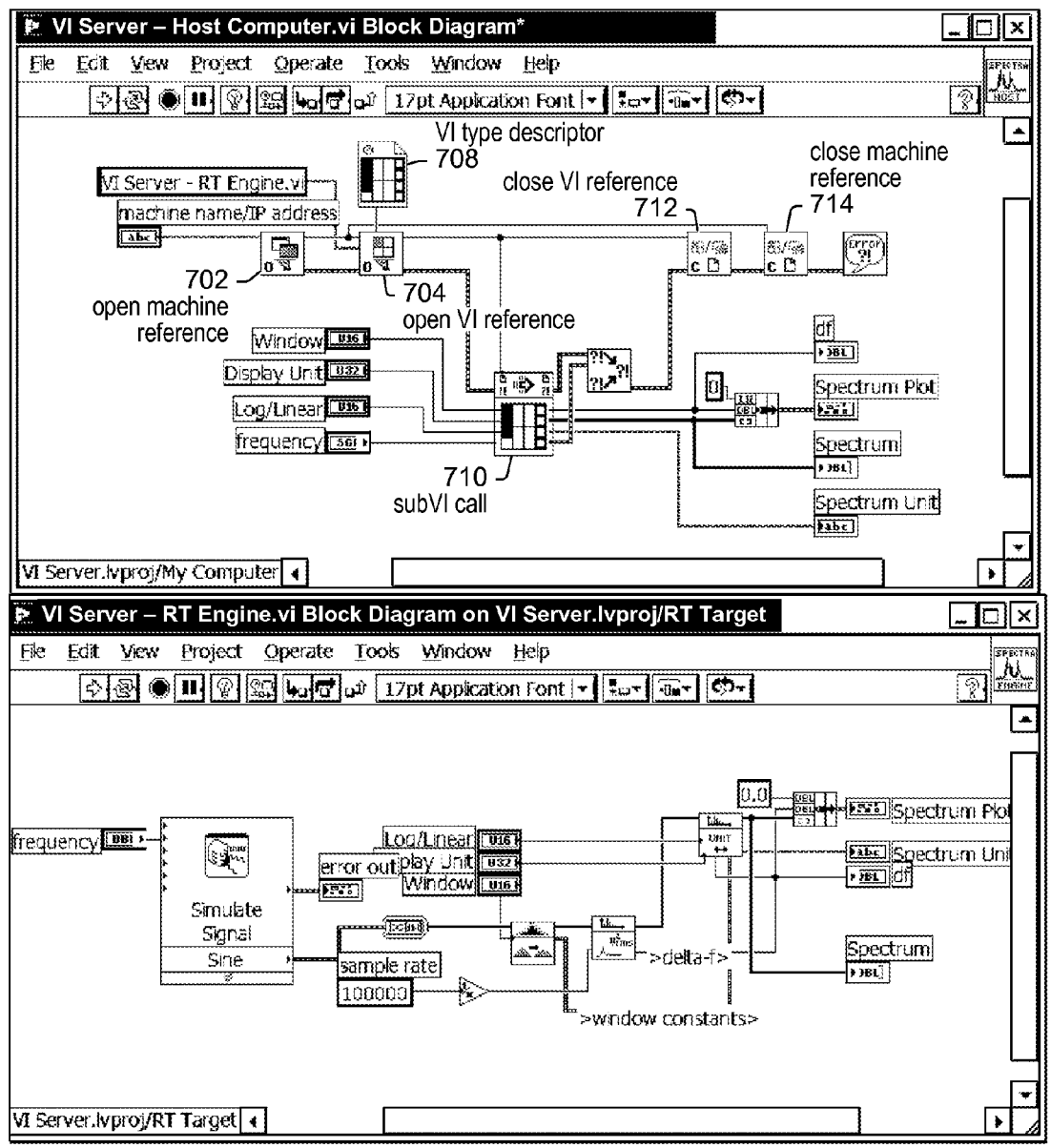
FIG. 7A illustrates an exemplary graphical program with distributed execution, according to the prior art.
Figure 7B:
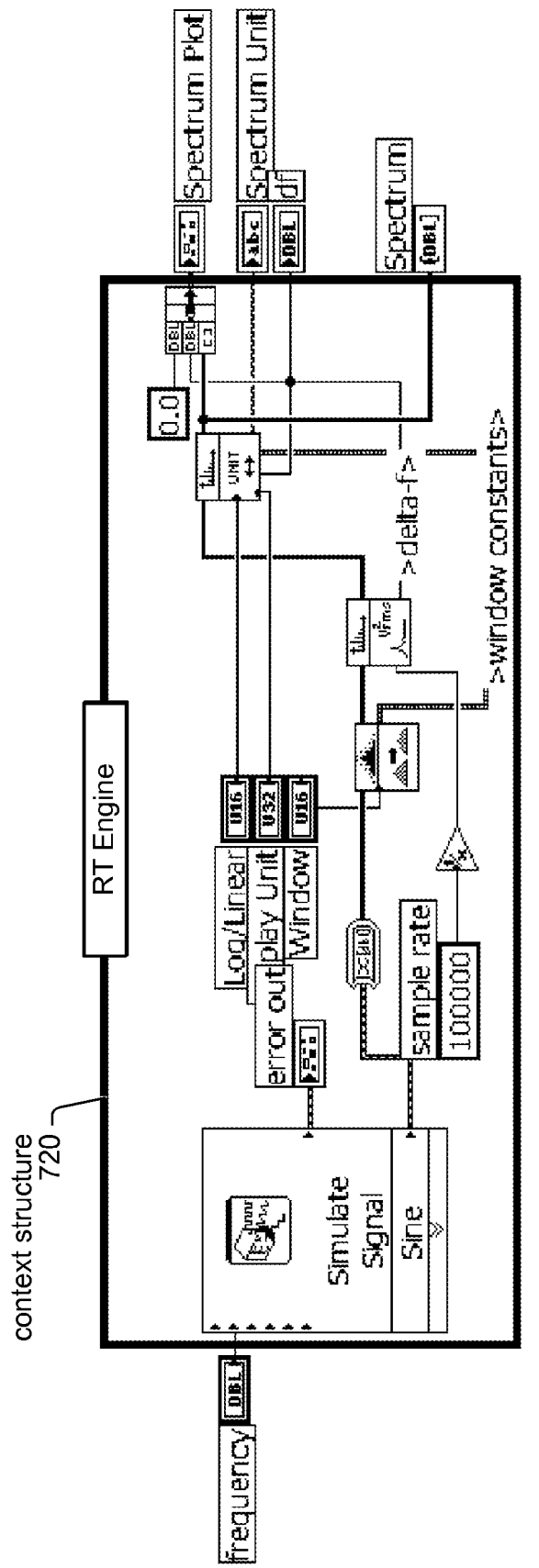
FIG. 7B illustrates an exemplary graphical program with distributed execution, according to one embodiment of the present invention.

FIGS. 7A and 7B—Comparison of Prior Art and an Embodiment of the Present Invention FIGS. 7A and 7B illustrate a comparison of a prior art approach to distributed execution of a graphical program and an embodiment of the present invention. More specifically, FIG. 7A illustrates two block diagrams (graphical programs or graphical program portions), where a first (top) block diagram calls a second graphical program via a subVI node, where the first block diagram executes in a first execution context targeted at a host computer, and the second (bottom) block diagram executes in a second execution context targeted at a real time (RT) engine that is separate and distinct from the host computer. The first (top) block diagram includes various graphical program nodes facilitating distributed or remote execution of the second (bottom) block diagram. For example, as may be seen, the first diagram includes an "open machine reference" node 702 that may operate to open or establish a connection to the remote execution target or platform. This node 702 is coupled to an "open VI reference" node 704, operable to open or establish a connection to the second block diagram or graphical program (portion). As also shown, the block diagram includes a VI type descriptor node 708 that may operate to identify or indicate the type of node whereby the second block diagram is invoked or called. Such a node that represents another graphical program or block diagram, and whereby the other block diagram may be called (for execution) may be referred to as a subVI node. As shown, such a node, specifically, subVI node 710, is also included in the first block diagram. In symmetry with the preparatory nodes (for the remote execution of the second block diagram) described above, the first block diagram also includes a "close VI reference" node, which may operate to close or terminate the connection to the second block diagram, as well as a "close machine reference node" 714, which may operate to close or terminate a connection to the (remote) execution target or platform. Note that these various nodes are all required (in this prior art approach) simply to call and execute the second block diagram on the designated target.

As may also be seen, the second (bottom) block diagram or graphical program (portion) includes various graphical program code (e.g., interconnected nodes) for generating a simulated signal and manipulating/analyzing the signal. Thus, the purpose of the first block diagram is simply to facilitate and invoke execution of the second block diagram on the specified target.

FIG. 7B illustrates a corresponding graphical program that performs similar functionality as those of FIG. 7A, but does so in accordance with one embodiment of the present invention. As may be seen, the block diagram of FIG. 7B is substantially the same as that of the second block diagram of FIG. 7A, but where the graphical program code is enclosed in a context structure 720. Note that the various nodes and connections of the first block diagram of FIG. 7A have effectively been replaced with the context structure 720, greatly simplifying the program. Note that in this embodiment, the name or designation of the (remote) execution target (RT Engine) is clearly labeled on the context structure, so that the user can clearly and easily see that the enclosed graphical code is specified or targeted for execution on the RT Engine.

Thus, various embodiments of the present invention may simplify both the graphical program code required, and the visual representation of the functionality of the graphical program, for distributed execution of graphical programs. For example, a graphical program that might normally have to be separated into various different block diagrams for respective execution on different execution targets may be presented as a single block diagram, where distributed execution of different portions of the graphical program may be simply and clearly designated and implemented by use of embodiments of the context structures disclosed herein.

It should be noted that while the above descriptions have been directed to distributed execution of a graphical program across two platforms or execution targets, the techniques described herein may be applied to an arbitrary number of execution targets. In other words, using embodiments of the techniques disclosed herein, execution of a graphical program may be distributed across any number of specified execution targets. Moreover, the execution distribution may be dynamic, where the execution assignments for various graphical code sections or portions may change during execution of the graphical program. For example, in a distributed computation system, the respective portions of the graphical program executing on each of a plurality of execution targets may change dynamically based on load balancing among the targets, i.e., based on the respective computational loads for each of the targets, where, for example, the computational loads may be adjusted to maximize, optimize, or stabilize overall efficiency or throughput.

Although the embodiments above have been described in considerable detail, numerous variations and modifications will become apparent to those skilled in the art once the above disclosure is fully appreciated. It is intended that the following claims be interpreted to embrace all such variations and modifications.

We claim:

1. A non-transitory memory medium that stores program instructions for creating a graphical program on a display having portions that execute on a first target and a second target, wherein the program instructions are executable to perform:
   creating a graphical program in response to user input, wherein the graphical program comprises a plurality of interconnected nodes that visually indicate functionality of the graphical program, wherein the graphical program includes a first graphical code portion with a first execution context specifying execution of the first graphical code portion on the first target; and
   establishing a second execution context for a second graphical code portion of the graphical program in response to user input, wherein the second execution context specifies the second target for execution of the second graphical code portion of the graphical program;
   wherein during execution of the graphical program, the first graphical code portion executes on the first target using the first execution context, and the second graphical code portion executes on the second target using the second execution context, and wherein the first and second graphical code portions of the graphical program execute in parallel.

2. The non-transitory memory medium of claim 1, wherein said establishing the second execution context comprises:
   displaying a context structure on the display in response to user input, wherein the context structure specifies the second execution context for graphical program code associated with the context structure; and
   associating the second graphical code portion with the context structure in response to user input.

3. The non-transitory memory medium of claim 2, wherein said associating the second graphical code portion with the context structure in response to user input comprises one or more of:
   the user dragging and dropping the second graphical code portion into the context structure; or the user drawing the context structure around the second graphical code portion.

4. The non-transitory memory medium of claim 2, wherein said establishing the second execution context comprises:
   configuring the context structure, including specifying the second target.

5. The non-transitory memory medium of claim 2, wherein the program instructions are further executable to perform:
   configuring the graphical program to dynamically change the configuration information for the context structure during execution of the graphical program, in response to user input.

6. The non-transitory memory medium of claim 2, wherein the program instructions are further executable to perform:
   the context structure deploying the second graphical code portion to the second target for execution on the second target, in accordance with attributes of the second target.

7. The non-transitory memory medium of claim 1, wherein the program instructions are further executable to perform:
   executing the graphical program on the first target, comprising:
      the first graphical code portion executing on the first target using the first execution context; and
      the second graphical code portion executing on the second target using the second execution context.

8. A computer-implemented method for creating a graphical program on a display having portions that execute on a first target and a second target, the method comprising:
   utilizing a computer to perform:
      creating a graphical program in response to user input, wherein the graphical program comprises a plurality of interconnected nodes that visually indicate functionality of the graphical program, wherein the graphical program includes a first graphical code portion with a first execution context specifying execution of the first graphical code portion on the first target; and
      establishing a second execution context for a second graphical code portion of the graphical program in response to user input, wherein the second execution context specifies the second target for execution of the second graphical code portion of the graphical program;
      wherein during execution of the graphical program, the first graphical code portion executes on the first target using the first execution context, and the second graphical code portion executes on the second target using the second execution context, and wherein the first and second graphical code portions of the graphical program execute in parallel.

9. The method of claim 8, wherein said establishing the second execution context comprises:
   displaying a context structure on the display in response to user input, wherein the context structure specifies the second execution context for graphical program code associated with the context structure; and
   associating the second graphical code portion with the context structure in response to user input.

10. The method of claim 9, further comprising:
    configuring the graphical program to dynamically change the configuration information for the context structure during execution of the graphical program, in response to user input.

11. The method of claim 9, further comprising:
    the context structure deploying the second graphical code portion to the second target for execution on the second target, in accordance with attributes of the second target.

12. The method of claim 8, further comprising:
    executing the graphical program on the first target, comprising:
       the first graphical code portion executing on the first target using the first execution context; and
       the second graphical code portion executing on the second target using the second execution context.

13. A system for creating a graphical program on a display having portions that execute on a first target and a second target, comprising:
    a processor;
    a memory medium coupled to the processor, wherein the memory medium stores program instructions; and
    a display, coupled to the memory and processor;
    wherein the program instructions are executable to:
       create a graphical program in response to user input, wherein the graphical program comprises a plurality of interconnected nodes that visually indicate functionality of the graphical program, wherein the graphical program includes a first graphical code portion with a first execution context specifying execution of the first graphical code portion on the first target; and
       establish a second execution context for a second graphical code portion of the graphical program in response to user input, wherein the second execution context specifies the second target for execution of the second graphical code portion of the graphical program;

wherein during execution of the graphical program, the first graphical code portion is operable to execute on the first target using the first execution context, and the second graphical code portion is operable to execute on the second target using the second execution context, and wherein the first and second graphical code portions of the graphical program execute in parallel.

14. The system of claim 13, wherein the processor, the memory medium, and the display are comprised in the first target, the system further comprising:

the second target;

wherein the context structure is executable to:

deploy the second graphical code portion to the second target for execution on the second target, in accordance with attributes of the second target; and wherein the program instructions are further executable to:

execute the graphical program on the first target, comprising:

the first graphical code portion executing on the first target using the first execution context; and the second graphical code portion executing on the second target using the second execution context.

15. The system of claim 13, further comprising:

the first target; and the second target;

wherein the program instructions are further executable to:

deploy the first graphical code portion to the first target for execution on the first target;

deploy the second graphical code portion to the second target for execution on the second target, in accordance with attributes of the second target; and execute the graphical program on the first target, comprising:

the first graphical code portion executing on the first target using the first execution context; and the second graphical code portion executing on the second target using the second execution context.

16. A non-transitory memory medium that stores program instructions for creating a graphical program on a display having portions that execute on a first target and a second target, wherein the program instructions are executable to perform:

creating a graphical program in response to user input, wherein the graphical program comprises a plurality of interconnected nodes that visually indicate functionality of the graphical program, wherein the graphical program comprises a graphical data flow program, wherein the graphical program includes a first graphical code portion with a first execution context specifying execution of the first graphical code portion on the first target; and establishing a second execution context for a second graphical code portion of the graphical program in response to user input, wherein the second execution context specifies the second target for execution of the second graphical code portion of the graphical program;

wherein during execution of the graphical program, the first graphical code portion executes on the first target using the first execution context, and the second graphical code portion executes on the second target using the second execution context.

17. The non-transitory memory medium of claim 16, wherein said establishing the second execution context comprises:

displaying a context structure on the display in response to user input, wherein the context structure specifies the second execution context for graphical program code associated with the context structure; and associating the second graphical code portion with the context structure in response to user input.

18. The non-transitory memory medium of claim 17, wherein the context structure is a timed structure.

19. The non-transitory memory medium of claim 18, wherein the context structure is a timed loop structure.

20. The non-transitory memory medium of claim 18, wherein the context structure is a timed sequence structure.

21. The non-transitory memory medium of claim 17, wherein said associating the second graphical code portion with the context structure in response to user input comprises one or more of:

the user dragging and dropping the second graphical code portion into the context structure; or the user drawing the context structure around the second graphical code portion.

22. The non-transitory memory medium of claim 17, wherein the context structure comprises one or more configurable terminals for communication between graphical code inside the context structure and graphical code outside the context structure.

23. The non-transitory memory medium of claim 17, wherein said establishing the second execution context comprises:

configuring the context structure, including specifying the second target.

24. The non-transitory memory medium of claim 23, wherein said configuring the context structure comprises:

connecting at least one graphical program element to the context structure; and the at least one graphical program element providing configuration information to the context structure, thereby configuring the context structure, wherein the configuration information includes a specification of the second target for execution of the second graphical code portion of the graphical program.

25. The non-transitory memory medium of claim 24, wherein the at least one graphical program element comprises a front panel communicatively coupled to the context structure, and wherein said providing configuration information to the context structure comprises:

the front panel dynamically receiving user input specifying the configuration information for the context structure; and the front panel dynamically providing the configuration information to the context structure to configure the context structure.

26. The non-transitory memory medium of claim 24, wherein the at least one graphical program element comprises a node coupled to the context structure, and wherein said providing configuration information to the context structure comprises:

the node providing the configuration information to the context structure to configure the context structure in accordance with attributes of the node.

27. The non-transitory memory medium of claim 24, wherein the context structure and associated graphical code is represented by a node in the graphical program, and wherein said providing configuration information to the context structure comprises:

the node making a call to the context structure, and passing the configuration information to the context structure.

28. The non-transitory memory medium claim 23,
wherein said configuring the context structure comprises connecting one or more wires to one or more terminals associated with the context structure in response to user input, wherein the one or more wires specify the configuration information.

29. The non-transitory memory medium of claim 23, wherein said configuring the context structure comprises specifying resource allocation and/or restriction on the second target for execution of the second graphical code portion, including one or more of:
processor usage on the second target;
bandwidth usage of a processor on the second target; or
usage of memory on the second target.

30. The non-transitory memory medium of claim 23, wherein said configuring the context structure comprises configuring one or more terminals on the context structure, thereby specifying how parameters are passed through the terminals.

31. The non-transitory memory medium of claim 17, wherein the program instructions are further executable to perform:
configuring the graphical program to dynamically change the configuration information for the context structure during execution of the graphical program, in response to user input.

32. The non-transitory memory medium of claim 31,
wherein one or more terminals for dynamically changing the configuration information for the context structure are associated with the context structure; and
wherein said configuring the graphical program to dynamically change the configuration information for the context structure comprises connecting one or more wires to the one or more terminals in response to user input.

33. The non-transitory memory medium of claim 17,
wherein one or more terminals for dynamically receiving information regarding a previous iteration or execution of the context structure are associated with the context structure; and
wherein said configuring the one or more nodes to receive the information comprises connecting the one or more nodes to the one or more terminals in response to user input.

34. The non-transitory memory medium of claim 17, wherein the program instructions are further executable to perform:
configuring one or more nodes associated with the context structure to receive information regarding a previous iteration or execution of the context structure during execution of the graphical program, in response to user input.

35. The non-transitory memory medium of claim 17, wherein said establishing the second execution context comprises:
invoking a graphical user interface (GUI) with respect to the context structure;
receiving user input to the GUI specifying the second execution context for the second graphical code portion, including specifying the second target for execution of the second graphical code portion; and
automatically configuring the second execution context in accordance with the user input to the GUI.

36. The non-transitory memory medium of claim 35, wherein the GUI comprises one or more of:
one or more dialogs;
one or more property pages;
one or more menus; and/or
a wizard.

37. The non-transitory memory medium of claim 35, wherein said automatically configuring the second execution context comprises one or more of:
creating a project;
adding computing nodes to the graphical program;
creating new nodes for the graphical program;
creating new block diagrams for inclusion in the graphical program;
copying one or more block diagrams in the graphical program;
downloading one or more portions of the graphical program to an execution context; and/or
adding variable configuration to the graphical program.

38. The non-transitory memory medium of claim 17, wherein the program instructions are further executable to perform:
the context structure deploying the second graphical code portion to the second target for execution on the second target, in accordance with attributes of the second target.

39. The non-transitory memory medium of claim 38, wherein said context structure deploying the second graphical code portion to the second target comprises:
automatically determining one or more elements required for the second graphical code portion to execute on the second target; and
deploying the one or more elements to the second target.

40. The non-transitory memory medium of claim 17, wherein the program instructions are further executable to perform:
executing the graphical program on the first target, comprising:
the first graphical code portion executing on the first target using the first execution context; and
the context structure invoking execution of the second graphical code portion on the second target using the second execution context.

41. The non-transitory memory medium of claim 16, wherein the program instructions are further executable to perform:
configuring the context structure statically, at compile or edit time of the graphical program.

42. The non-transitory memory medium of claim 16, wherein the program instructions are further executable to perform:
re-configuring the context structure dynamically at runtime of the graphical program.

43. The non-transitory memory medium of claim 16, wherein the first execution context comprises a default execution context for the graphical program.

44. The non-transitory memory medium of claim 16, wherein the first target and/or the second target includes one or more of:
a central processing unit (CPU);
a programmable hardware element;
a digital signal processor (DSP); and/or
a micro-controller.

45. The non-transitory memory medium of claim 16, wherein the program instructions are further executable to perform:
executing the graphical program on the first target, comprising:
the first graphical code portion executing on the first target using the first execution context; and
the second graphical code portion executing on the second target using the second execution context.

46. The non-transitory memory medium of claim 16, wherein the first and second code portions are loosely bound such that the first code portion can execute when the second code portion is inoperable.

47. The non-transitory memory medium of claim 16, wherein the graphical program is developed under a development environment, wherein the behavior of the environment with respect to the second graphical code portion is dependent on the specification of the second target, and wherein the behavior includes one or more of:
- restricting graphical nodes available for inclusion in the second graphical code portion to those supported by the second target;
- target-specific syntax checking for the second graphical code portion;
- target-specific semantics checking for the second graphical code portion;
- target-specific help information regarding the second graphical code portion; and/or
- visual appearance for graphical nodes in the second graphical code portion.

48. The non-transitory memory medium of claim 16, wherein said establishing the second execution context for the second graphical code portion comprises configuring the second execution context, including specifying the second target.

49. The non-transitory memory medium of claim 48,
- wherein the second graphical code portion is a sub-diagram represented by a node in the graphical program, and wherein the node is executable to make a call to the second graphical code portion to execute the second graphical code portion;
- wherein the sub-diagram comprises an implicit context structure that specifies the second execution context; and
- wherein said configuring the second execution context is performed by configuring the sub-diagram.

* * * * *